(12) United States Patent
Korycan et al.

(10) Patent No.: US 6,409,457 B1
(45) Date of Patent: *Jun. 25, 2002

(54) WORK VEHICLE

(76) Inventors: George Korycan, 9709 S. Seeman Rd., Union, IL (US) 60180; Libor Belohoubek, Rooseveltova 28, 164 00 Prague 6 (CS)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,634

(22) Filed: Oct. 15, 1999

(51) Int. Cl.$^7$ ................................ B60P 1/04; B60P 1/54
(52) U.S. Cl. ................. 414/501; 180/242; 414/470; 414/487; 414/550; 414/912; 414/687
(58) Field of Search ................. 414/470, 486, 414/487, 501, 543, 547, 549, 550, 687, 703, 723, 912; 180/242, 306, 321, 324, 403; 280/79.6, 79.7

(56) References Cited

U.S. PATENT DOCUMENTS

| 3,272,280 A | * | 9/1966 | Schuetz | 180/403 |
| 3,601,169 A | * | 8/1971 | Hamilton et al. | 414/550 |
| 3,664,528 A | * | 5/1972 | Gauchet | 414/694 |
| 3,669,286 A | * | 6/1972 | Gauchet | 414/694 |

(List continued on next page.)

FOREIGN PATENT DOCUMENTS

| DE | 2303685 | 8/1974 |
| DE | 19 60 552 B2 | 1/1979 |
| DE | 27 57 968 B1 | 4/1979 |
| DE | 25 58 799 B2 | 1/1981 |
| DE | 40 03 325 A1 | 8/1991 |
| DE | 196 12 559 A | 10/1996 |
| EP | 0 440 488 A2 | 8/1991 |
| FR | 1535960 | 9/1967 |
| FR | 2696199 | 9/1992 |
| GB | 787520 | 12/1957 |
| GB | 1061073 | 3/1967 |
| GB | 1109803 | * 4/1968 | ................ 414/486 |
| RU | 2031016 | 3/1995 |
| RU | 2082631 | 6/1997 |
| RU | 2091254 | 9/1997 |
| SU | 1224195 | 4/1986 |
| WO | WO 84/02153 | 6/1984 |

OTHER PUBLICATIONS

The Official Gazette, Nov. 25, 1997, p. 3455—U.S. Patent Design 386,769 filed Feb. 12, 1996 Class 15 Sub Class 03.
International Search Report from European Patent Office for corresponding PCT application PCT/US00/28459 established Feb. 7, 2001.

*Primary Examiner*—James W. Keenan
(74) *Attorney, Agent, or Firm*—Morris, Manning & Martin LLP

(57) ABSTRACT

The invented vehicle includes a chassis, a cabin mounted on a first side of the chassis on a forward portion thereof, and a plurality of wheels coupled to the chassis to movably support the chassis. The vehicle also includes a boom unit, a tool coupled to an end of the boom unit, and turntable unit mounted to the chassis at a central portion thereof, the turntable unit coupled to and supporting the boom unit for rotation relative to the chassis. The turntable unit is capable of moving the boom unit and the tool over a second side of the chassis opposite the first side between a first position at which the tool is positioned forward of the chassis to pick up the load and a second position at which the tool is positioned over the dump body to dump the load into the dump body. The vehicle also includes a dump body mounted to a rear portion of the chassis. The dump body can be tilted to the rear or either side of the vehicle. The tool attached to the boom unit can be a dipper bucket, a loader bucket, a mower, thresher or auger, for example. An accessory tool such as a mower can also be attached to the rear of the vehicle.

51 Claims, 26 Drawing Sheets

U.S. PATENT DOCUMENTS

| | | | | |
|---|---|---|---|---|
| 3,768,665 A | * | 10/1973 | Eiler et al. | 180/324 |
| 3,876,095 A | * | 4/1975 | Stedt | 414/487 |
| 3,954,194 A | | 5/1976 | Stedman | 214/75 |
| 4,266,617 A | * | 5/1981 | Mullet et al. | 180/306 |
| 4,318,451 A | * | 3/1982 | Liggett | 180/324 |
| 4,378,193 A | * | 3/1983 | Schaeff | 414/695 |
| 4,436,177 A | * | 3/1984 | Elliston | 180/324 |
| 4,516,655 A | * | 5/1985 | Donahue et al. | 414/687 |
| 4,540,032 A | * | 9/1985 | Pelletier et al. | 414/486 |
| 4,583,908 A | * | 4/1986 | Crawford | 414/694 |
| 4,737,067 A | * | 4/1988 | Samejima et al. | 414/912 |
| 4,854,814 A | * | 8/1989 | Smith et al. | 414/723 |
| 4,871,292 A | * | 10/1989 | Milanowski | 414/723 |
| 4,966,242 A | * | 10/1990 | Baillargeon | 180/242 |
| 5,106,255 A | | 4/1992 | Motoda et al. | 414/540 |
| 5,174,115 A | * | 12/1992 | Jacobson et al. | 180/324 |
| 5,188,502 A | | 2/1993 | Tonsor et al. | |
| 5,468,120 A | | 11/1995 | Krob | 414/695 |
| 5,590,731 A | * | 1/1997 | Jacobson | 180/306 |
| 5,625,967 A | * | 5/1997 | Kulle | 414/694 |
| 5,647,441 A | | 7/1997 | Gibbons | 172/439 |
| 5,661,917 A | * | 9/1997 | Marchetta | 414/694 |
| 5,727,921 A | * | 3/1998 | Brown | 414/694 |
| 5,934,727 A | | 8/1999 | Storc et al. | |
| 6,000,154 A | * | 12/1999 | Berard et al. | 414/912 |

* cited by examiner

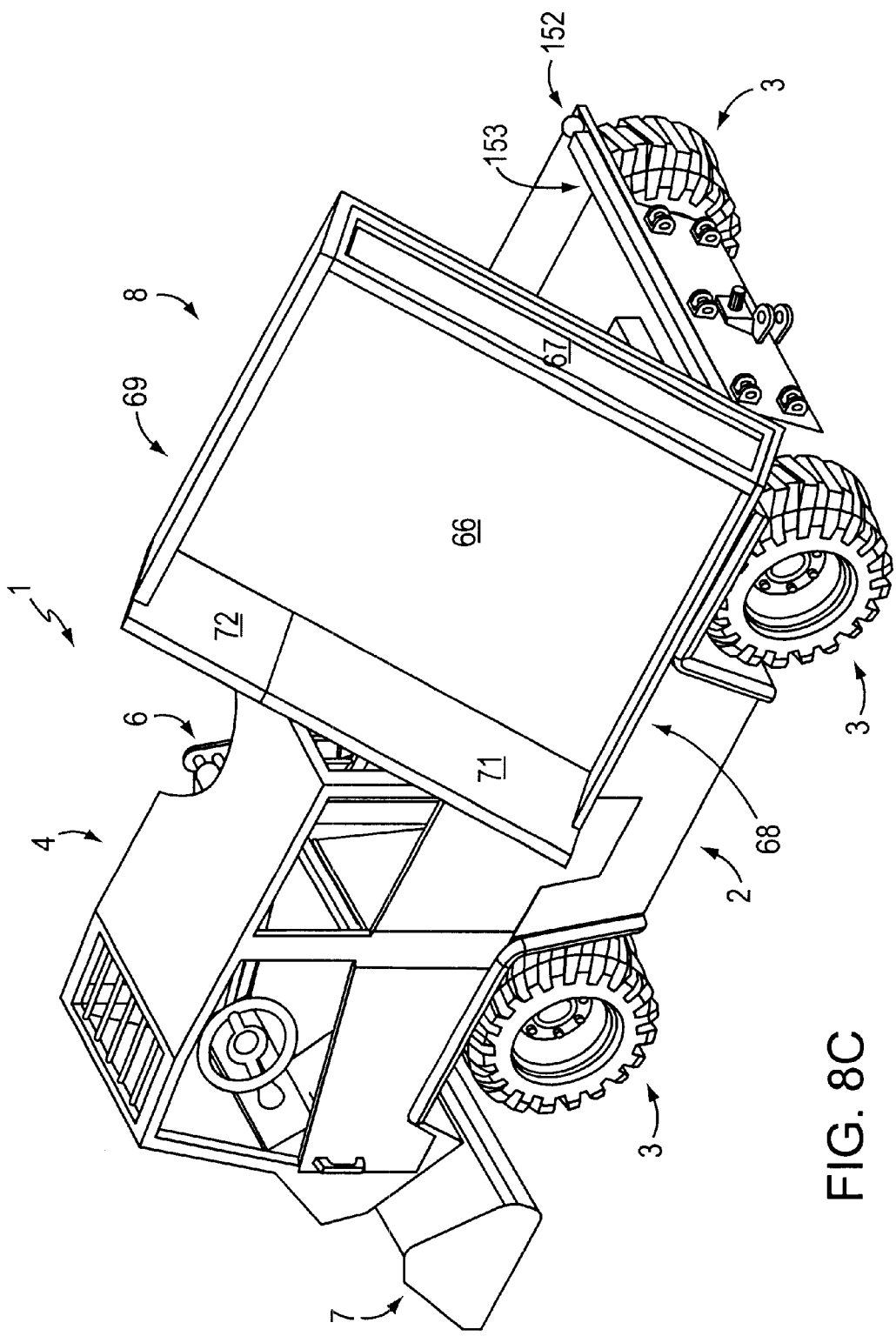

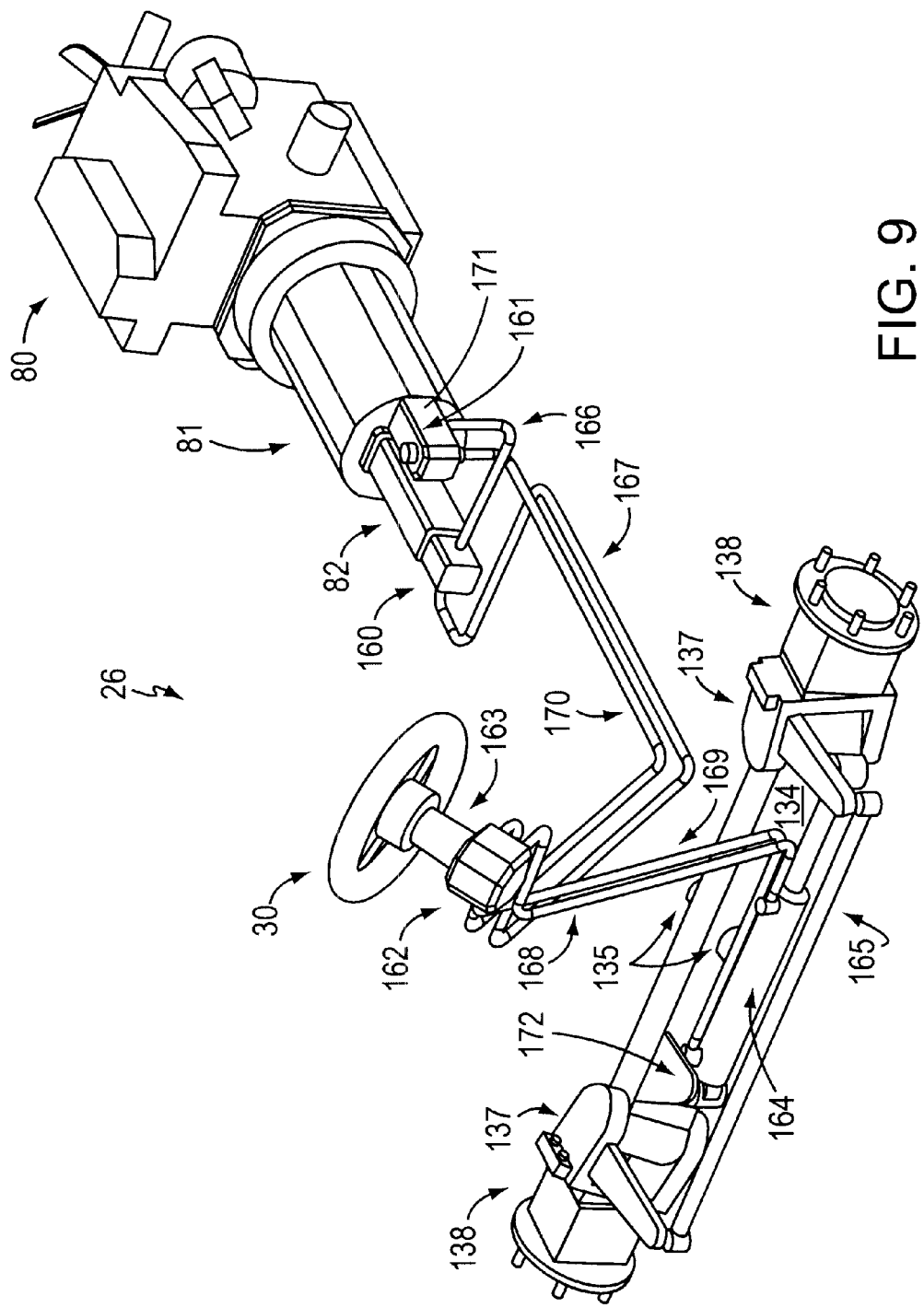

WORK VEHICLE

FIELD OF THE INVENTION

1. Background of the Invention

The invention is directed to a vehicle capable of performing a wide range of tasks. For example, the vehicle can perform the functions of a tractor, bulldozer, dump truck, ditch digger, mower, and carrier. The versatility of the vehicle makes it effective for use in construction, landscaping, excavation, road work, farm and other work environments.

2. Description of the Related Art

U.S. Pat. No. 5,468,120 issued Nov. 21, 1995 to Adolf Krob discloses a vehicle with four wheels, a driver's cabin mounted assymetrically on a front portion of the vehicle, a load container mounted to the rear portion of the vehicle, a working boom coupled to a rail at the side of the driver's cabin, and a tool attached to the end of the working boom. The rail extends from the front to the back of the cabin, and supports a rotary actuator to which the working boom is attached. To allow the boom to swing out in front or in back of the cabin, a rotary actuator coupled between the boom and the rail. The boom unit has three additional hydraulic actuators to control movement of the boom unit and attached tool. Because the boom is coupled to the rail at the side of the cabin at a position well off-center with respect to the vehicle's center of gravity, the vehicle has a tendency to tip over. The vehicle therefore includes an actuator and arms extending from the front of the vehicle to serve as an outrigger to stabilize the vehicle during operation of the boom. For storage during travel, a tool such as a load bucket can be positioned with the boom in the load container and detached, after which the boom is folded along the vehicle's side. If the tool is a relatively small shovel or dipper bucket, the tool can remain attached to the boom unit and folded against the side of the vehicle for storage during travel. The vehicle is also equipped with an adaptation blade and a hydropneumatic spring system to raise and lower the vehicle to pick-up or drop off a tool from the adaptation blade.

Although meritorious in several respects including its versatility, the vehicle disclosed in U.S. Pat. No. 5,468,120 also suffers from several disadvantages. For example, due to the fact that the boom unit is well off-center with respect to the vehicle's center of gravity, one or more outriggers must be used to stabilize the vehicle while lifting loads or working the tool with the boom. Such outriggers add to the complexity and expense of the vehicle. Also, the vehicle's cabin has space only for one person who must drive the vehicle and operate the boom and tool. To discharge a load from the tool into the load container, the operator must manipulate the boom and tool controls while using rear view mirrors or while turning to look backward to view the position of the boom and tool with respect to the rear-mounted load container. Such actions are difficult and strenuous for the operator, and present significant risk of a loss of control of the boom and tool and/or discharge of the load in an undesired location. In addition, because the boom of U.S. Pat. No. 5,468,120 is positioned so far off-center on its vehicle, certain tools such as mowers cannot be attached to the boom because they require coupling to the vehicle along the direction of motive force applied by the vehicle. Therefore, rather than using its boom as an attachment for tools such as mowers or threshers, the vehicle of U.S. Pat. No. 5,468,120 requires a particular adaptation blade to be mounted to the front of the vehicle as well as tools configured to mate with the adaptation blade. In addition, such vehicle requires a hydropneumatic spring system to raise and lower the vehicle to engage or disengage the adaptation blade with the specially-configured tools. Such adaptation blade, tools and hydropneumatic spring system add significant complexity and cost to the vehicle. In addition, the vehicle of U.S. Pat. No. 5,468,120 must be configured to provide sufficient space for the boom when folded against the side of the vehicle. This eliminates space for fuel or hydraulic fluid tanks normally positioned on the sides of such vehicles. Furthermore, the vehicle of U.S. Pat. No. 5,468,120 is not equipped to transport relatively unwieldy loads such as logs, poles, bars, columns or other elongated objects. It would be desirable to provide a vehicle that overcomes the above-stated disadvantages.

SUMMARY OF THE INVENTION

It is an object of the invention to provide a vehicle that is highly versatile and adaptable for use with different tools, yet which is relatively simplified in construction and use as compared to previous vehicles.

It is another object of the invention to provide a vehicle having a boom unit and coupled tool, that is configured for enhanced stability relative to previous vehicles and which requires no outriggers or other stabilizers for operation.

It is a further object of the invention to provide a vehicle with sufficient space for two persons, i.e., an operator and a co-operator, in which the co-operator can readily view the boom unit and attached tool as they are positioned over the vehicle's dump body to assist in operation and discharge of a load into the dump body in a relatively safe manner.

It is an additional object of the invention to provide a vehicle with a boom unit usable not only for tools such as load or dipper buckets, but also with other tools such as mowers, threshers, augers, etc., especially those which must be driven by the vehicle in a relatively straight-on manner to be operated effectively.

It is yet another object of the invention to provide a vehicle in which the boom unit and coupled tool can be stored in the vehicle's load body during travel to provide enhanced space for storage tanks on the vehicle sides as compared to previous vehicles.

It is still another object of the invention to provide a vehicle capable of handling unwieldy loads such as relatively logs, poles, bars, columns or other elongated objects.

The vehicle of this invention includes a chassis, a cabin mounted on a first side of the chassis on a forward portion thereof, and a plurality of wheels coupled to the chassis to movably support the chassis on the ground. The vehicle also includes a boom unit mounted to the chassis adjacent the cabin, a tool coupled to an end of the boom unit, and a turntable unit mounted to the chassis at a central portion thereof. The boom unit is coupled to the turntable unit which supports the boom unit for rotation. The vehicle also includes a dump body mounted to a rear portion of the chassis. The turntable is capable of moving the boom unit and the tool over a second side of the chassis opposite the first side between a first position at which the tool is positioned forward of the chassis to pick up a load, and a second position at which the tool is positioned over the dump body to dump the load into the dump body. The boom unit can be adapted for coupling to different tools. For example, the tool can be a load bucket, a dipper bucket, an auger unit, a mower or a thresher. The vehicle can include at least one hanger member mounted to the chassis, which can be coupled to support the tool. The cabin can include a first seat for an operator of the vehicle and a second seat for a co-operator of the vehicle. The two seats can be positioned back-to-back to provide the co-operator with a clear view of the dump body and surrounding area to assist in moving the boom unit and tool to dump a load of earth, for example, into the dump body with accuracy. The dump body can be tilted relative to the chassis to discharge a load from the dump body. The dump body can be configured to dump the load from the rear end or on either side of the vehicle. The dump body can be configured with a floor portion surrounded by a front face, tailgate, and two side faces. A portion of the front face and the tailgate can be lowered to positions providing clearance for elongated load objects.

These together with other features and advantages, which will become subsequently apparent, reside in the details of construction and operation as more fully hereinafter described and claimed, reference being made to the accompanying drawings, forming a part hereof wherein like numerals refer to like parts throughout the several views.

BRIEF DESCRIPTION OF THE DRAWINGS

FIGS. 8A–8D are perspective views of the vehicle's dump body in various attitudes, and related elements;

FIG. 9 is a perspective view of the steering unit of the invented vehicle;

Description of the Preferred Embodiments

Figure 1:
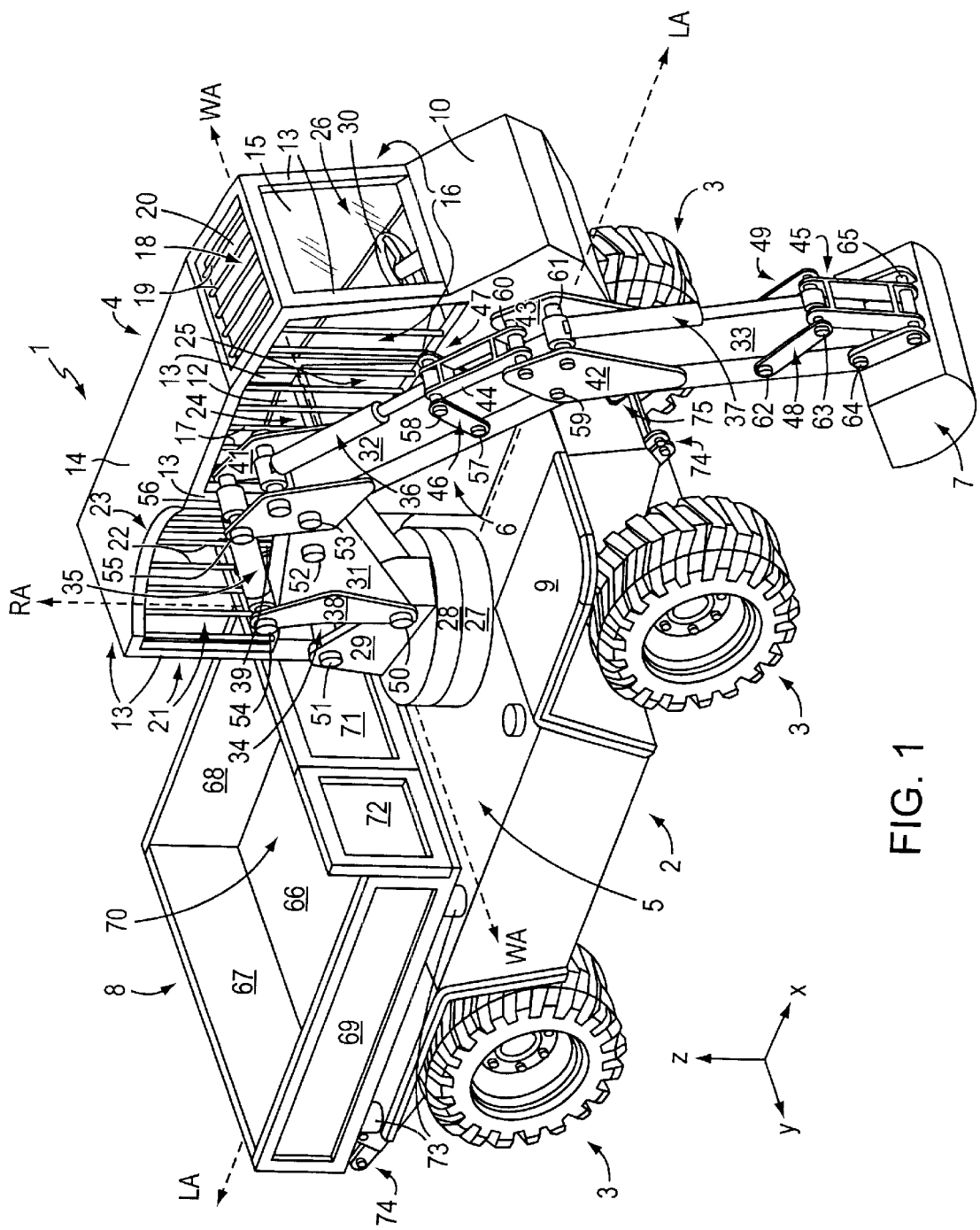
FIG. 1 is a perspective view of a vehicle of the present invention.

As used herein, the following terms have the following definitions:

"Central portion of the chassis" is defined as an area of the upper surface of the chassis that is centered away from the front, rear and side edges of the chassis. More specifically, the chassis has a length L along the longitudinal axis LA and a width W along the width axis WA normal to axis LA. The central portion of the chassis is inward by at least twenty percent of the length L from the front and rear edges of the vehicle's chassis, and at least twenty percent of the width W inward from the side edges of the vehicle's chassis.

"Longitudinal axis LA" refers to an axis perpendicularly disposed with respect to the front and rear edges of the chassis and symmetrically dividing the chassis through its middle. The longitudinal axis is normal to the width and rotational axes. "Width axis WA" refers to an axis perpendicularly disposed with respect to the side edges of the chassis and separates the forward portion of the chassis on which the cabin is mounted, and the rear portion of the chassis on which the dump body is mounted. The width axis WA need not symmetrically divide the front and rear portions of the chassis.

"Rotational axis RA" refers to an axis at least approximately perpendicular (i.e., within ± 30° of angle) to the longitudinal axis LA and the width axis WA and the upper surface of the chassis, about which the turntable unit rotates.

"Turntable unit" includes parts 27, 28, shaft 85, crank 86, actuators 87, 88, and base 29.

"Boom unit" includes arms 31, 32, optionally arm 33, actuators 34, 35, 36 and associated elements such as plates, links, levers and bolts.

"Tool" refers to a dipper bucket, loader bucket, mower, thresher, auger or other tool to be moved by the boom unit and turntable unit.

"Control element" refers to control sticks 93, 94 and switches 144–150 or other elements.

"Control unit" refers to controller 92, control sticks 93, 94, switches 144–150, and valve block control unit 83.

1. General Disclosure of the Invented Vehicle

In FIG. 1, a preferred embodiment of the vehicle 1 of the present invention is shown. In the preferred embodiment, the vehicle 1 basically includes a chassis 2, a plurality of wheels 3, a cabin 4, a turntable unit 5, a boom unit 6, a tool 7, and a dump body 8. The chassis 2 can be approximately block-like in configuration with a hollow interior for housing and supporting the vehicle's motor, hydraulic pump, and other elements (not shown in FIG. 1). For strength and durability, the chassis 2 is substantially integral and includes no body hinges between front and rear wheels 3 which would weaken the structure. By way of example and not limitation, the chassis 2 can be about five (5) meters in a direction along the longitudinal axis LA, and can be about two-and-a-half (2.5) meters wide along the width axis WA. The wheels 3 are rotatably coupled to the chassis 2 and support the chassis above the ground. The chassis 2 can be defined with recessed portions in the front and rear corner areas thereof to provide space for four wheels 3 at each corner of the chassis. However, as few as three or more than four wheels 3 could be used if desirable for the working environment in which the vehicle 1 is to be used. The chassis 2 can define one or more fenders 9 in proximity to the wheels 3 to lessen mud splatter if operating the vehicle 1 in rainy or wet environments.

The cabin 4 is mounted on one side of the chassis 2 on a forward portion thereof. More specifically, the cabin 4 is mounted on one side (i.e., the left-hand side in FIG. 1) of the longitudinal axis LA of the chassis 2. The longitudinal axis LA extends from the front end to the rear end of the vehicle chassis 2 symmetrically through the middle thereof and divides the chassis into right and left sides. The cabin 4 is located forward of the width axis WA which extends transversely across the vehicle 1 and is normal to the longitudinal axis LA. The width axis WA separates and defines the front and rear portions of the vehicle chassis 2. The cabin 4 essentially defines a box-like compartment having a closed bottom portion 10 accessible by front and rear doors 11, 12 to permit entry or exit of the operator and co-operator of the vehicle, respectively. The cabin 4 has elongated support beams 13 having lower ends mounted to the bottom portion 10 at spaced locations about the upper edge of such bottom portion. The support beams 13 extend upwardly from the bottom portion 10, and have upper ends opposite the lower ends, such upper ends being mounted to and supporting the cabin's roof 14. Positioned between the front two beams 13, the cabin 4 has a front window 15 composed of durable material such heavy glass or plastic or other relatively strong, transparent material, to provide protection and visibility for the operator. The cabin 4 also defines side openings 16 to permit the operator to look out of the side of the cabin 4 while operating the vehicle. For protection of the driver, at least the side opening 16 closest to the boom unit 6 is covered with a grill 17. The grill 17 can be composed of durable, rigid bars of steel, for example, which have opposite ends securely mounted such as by welding between the bottom portion 10 and the roof 14. For enhanced visibility of the boom unit 6 and coupled tool 7 if lifted to a relatively high position above the line-of-sight of the operator through the window 15, the cabin's roof 14 can define a roof opening 18 protected by a grill 19. To prevent rain from entering the cabin 4, the roof opening 18 can be closed with a panel 20 slidably mounted to the roof 14 of the cabin 4. The cabin 4 can also define side and rear openings 21 at the rear upper portion of the cabin 4 preferably covered with a grill 22 at least on the side of the cabin facing the boom unit 6 for enhanced safety of the vehicle occupants. The cabin 4 is preferably formed with a concave portion 23 at the inner side of the cabin 4 closest to the axis LA. The concave portion 23 provides clearance for operation of the boom unit 6 as it rotates on turntable unit 5. By so configuring the cabin 4, the boom unit 6 can be mounted to the chassis 2 via turntable unit 5 at a position more closely centered on the vehicle than otherwise possible. By mounting the boom unit 6 on the turntable unit 5 located at a relatively central portion of the vehicle 1, the stability of the vehicle is greatly enhanced during operation of the turntable and boom units and tool, so much so that outriggers are generally not required for the vehicle 10.

The cabin 4 also includes front and rear seats 25, 24 mounted inside the cabin, preferably in a back-to-back relationship. This arrangement of the seats permits the operator in the front seat 25 to face forwardly to view the area in front of the vehicle while driving, as well as to permit the operator to observe and control the operation of the boom unit 6 and coupled tool 7 if positioned to the front or side of the vehicle. Because the co-operator's seat 24 faces toward the rear of the vehicle 1, the co-operator has a clear view of the boom unit 6 and the coupled tool 7 if positioned to the side or rear of the vehicle. On the other hand, the co-operator has a clear view of the boom unit 6 and coupled tool 7 if positioned over the dump body 8. The co-operator can assist in positioning of the boom unit 6 and coupled tool 7 relative to the dump body 8 to ensure that a load carried by the tool is properly discharged into the dump body. The co-operator also has a clear view of the dump body 8 during the operation of tilting the dump body to discharge a load. The co-operator's clear view of the boom unit 6 and tool 7 as well as the dump body 8 and the areas in which a load is to be dumped is highly advantageous from the view point of avoiding accidents resulting from contact with the boom unit 6 or tool 7 during operation or by misplacement of loads from the tool 7 or the dump body 8 if tilted.

The vehicle 1 can include a steering unit 26 with wheel 30 mounted in the cabin 4 in a position accessible to the operator if seated in the seat 25. The steering unit 26 is coupled to at least the front wheels 3 to permit the operator to turn the vehicle 1. The vehicle 1 can also include one or more control elements such as control sticks and switches (not shown in FIG. 1) positioned to permit the operator and/or co-operator to control the turntable unit 5, the boom unit 6 and/or the tool 7 as well as the dump body 8.

The turntable unit 5 is mounted to the chassis 2 at a central portion of the upper surface thereof. The turntable unit 5 is capable of rotating about a rotational axis RA which is preferred to be normal to the upper surface of the chassis 2. Preferably, the turntable unit 5 is mounted to the upper surface of the chassis 2 on a central portion thereof so that the distance between the rotational axis RA of the turntable unit 5 and the wheels 3 is relatively large. The relatively large spacing of the turntable unit 5 relative to the wheels 3 helps to ensure stability of the vehicle 1 while operating the turntable unit 5, boom unit 6, and the tool 7. The turntable unit 5 includes parts 27, 28. The part 27 is mounted to or integrally formed with the chassis 12. The part 28 is rotatably mounted on the part 27 so that it can be driven to rotate about the rotational axis RA via the vehicle's motor, hydraulic pump and hydraulic actuators (not shown in FIG. 1) which will be described in more detail in a subsequent section of this document. The parts 28 can be supported for rotation relative to the part 27 by bearings (not shown) positioned there between, for example, in a manner that is well-known to those of ordinary skill in this technology.

The boom unit 6 is mounted to the turntable unit 5. In the configuration of FIG. 1, the boom unit 6 includes base 29, arms 31–33, hydraulic actuators 34–37, mounting plates 38–43, links 44, 45, levers 46–49, and bolts 50–65. The base 29 is mounted to the turntable unit 5 and includes two opposing plates extending upwardly in a spaced and opposing relationship. The arm 31 is approximately triangular and elongated if viewed in side elevation, and is approximately U-shaped in cross-section with spaced opposing plates joined by an end plate forming the arm's upper surface which extends between the upper edges of such arm's spaced plates. The arm 31 is arranged so that its opposing plates straddle the plates of the base 29. The mounting plates 38, 39 are fixed to the arm 31 on respective sides thereof by welding, for example. The bolt 50 extends through apertures defined in the plates 38, 39, the opposing plates of the arm 31 at lower portions thereof, and the opposing plates of the base 29. The bolt 50 acts as the pivot point about which the arm 31 and plates 38, 39 can rotate relative to the plates of the base 29. The hydraulic actuator 34 is positioned between the plates of the base 29 and the opposing plates of the arm 31. A first end of the hydraulic actuator 34 is pivotally coupled to the bolt 51, which extends through and is coupled to the opposing plates of the base 29. The second, opposite end of the hydraulic actuator 34 is pivotally coupled to the bolt 52, which extends through and is fixed to the arm 31 at an outer end thereof. The bolts 51, 52 are positioned relative to the pivot bolt 50 so that the hydraulic actuator 34 exerts a torque on the arm 31 about such pivot bolt if actuated. The arm 32 is elongated and has plates 40, 41 attached on opposite sides of a first end thereof by welding, for example. The arm 32 is positioned so that the plates 40, 41 are arranged on opposite sides of a second end of the arm 32 opposite its first end. The bolt 53 extends through apertures defined in the plates 40, 41 and the arm 32, and is fixed to such plates and arm. The bolt 53 pivotally couples the arm 32 to the arm 31 so that the arm 32 can be rotated relative to the arm 31 about a pivot defined by the bolt 53. The hydraulic actuator 35 has afirst end pivotally coupled to the bolt 54 which is secured between plates 38, 39. The hydraulic actuator 35 also has a second end opposite its first end, that is pivotally coupled to the bolt 55 which extends through and is fixed to the plates 40, 41. The bolts 54, 55 are fixed by respective plates 38, 39 and 40, 41 in respective positions that are spaced relative to the pivot bolt 53 to permit the hydraulic actuator 35 to exert a torque upon the plates 40, 41 to pivot the arm 32 relative to the arm 31 about the pivot bolt 53. The arm 33 has plates 42, 43 fixed by welding, for example, to opposite sides of a first end of the arm 33. The arm 33 is pivotally coupled to the second end of the arm 32 opposite its first end by the bolt 59 which extends through apertures defined in the plates 42, 43 and the arm 33 which is positioned between such plates. A first end of the hydraulic actuator 36 is pivotally coupled to the bolt 56, which extends through and is fixed to the plates 40, 41 through apertures defined therein. The opposite end of the hydraulic actuator 36 is situated between flanges at a first end of the link 44. Ends of the levers 46, 47 are coupled to opposite sides of the arm 32 via the bolt 57 about which such levers are free to pivot. The opposite ends of the levers 46, 47 are pivotally coupled to the second end of the hydraulic actuator 36 and the flanges at a first end of the link 44 via the bolt 58. The arm 33 has plates 42, 43 fixed by welding, for example, to one end thereof. The second end of the arm 32 is situated between the plates 42, 43 and is pivotally coupled thereto by the bolt 59. The bolt 60 extends through an upper portion of the plates 42, 43 and secures flanges at the second end of the link 44 opposite its first end, to such plates. The second end of the link 44 can pivot about the bolt 60 as the actuator 36 extends or retracts. The bolts 56, 60 are positioned at respective locations spaced apart from the pivot bolt 59 to permit the actuator 36 to exert a torque about such pivot bolt to rotate the arm 33 relative to the arm 32. The tool 7 is pivotally coupled to the second end of the arm 33 opposite its first end via the bolt 64. More specifically, the tool 7 has opposing, upstanding plates between which the end of the arm 33 is positioned. The bolt 64 extends through apertures defined in the plates of the tool 7 and the arm 33, to pivotally couple such arm and tool together. The hydraulic actuator 37 has one end coupled between plates 42, 43 via the bolt 61. First ends of the levers 48, 49 are pivotally mounted on opposite sides of a relatively central portion of the arm 33 via the bolt 62. A first end of the link 45 has opposing flanges between which the second end of the, hydraulic actuator 37 is positioned. The bolt 63 extends through the second ends of the levers 48, 49 opposite their respective first ends, the flanges at the first end of the link 45, and the second end of the hydraulic actuator 37 that is opposite its first end, through apertures defined in such elements. The bolt 63 secures such elements together. The second end of the link 45 opposite its first end is coupled to the tool 7 via the bolt 65. In FIG. 1, the tool 7 is a dipper bucket, although other tools such as a loader bucket, mower, thresher, or auger unit could be used as the tool coupled to the boom unit 6.

The hydraulic actuators 34–37 are coupled to receive flows of pressurized hydraulic fluid from at least one hydraulic pump (not shown in FIG. 1) housed in the chassis 2, based on the manipulation of control sticks and/or switches (not shown in FIG. 1) by the operator. Based on the flow of the pressurized hydraulic fluid, the hydraulic actuators extend or retract to pivot the arms 31–33 and the tool 7 relative to one another and the chassis 2 to operate the boom unit 6 and the coupled tool 7.

The dump body 8 is mounted to the rear portion of the vehicle 1. The dump body 8 can include a floor portion 66, a tailgate 67, two side faces 68, 69, and a front face 70 composed of fixed portion 71 and folding portion 72. The tailgate 67 and side and front faces 68–70 can be positioned to extend upwardly from the floor portion 66. As so positioned, the tailgate and front face oppose one another, and the two side faces oppose one another. In this position, the tailgate 67 and faces 68–70 define a container for a load to be carried by the vehicle 1. The side faces 68, 69 and the fixed portion 71 of the front face 70 are preferably fixed in position with respect to the floor portion 66. On the other hand, the lower end of the tailgate 67 is hinged to the rear edge of the floor portion 66. Latches (not shown) coupling the tailgate 67 with adjacent side faces 68, 69 can be used to hold the tailgate in an upstanding position to contain a load, or can be released to disengage the tailgate from the side faces 68, 69 to permit the tailgate 67 to be moved downwardly so that a load in the dump body 8 will slide out the rear of the dump body 8 if the dump body 8 is tilted upwardly at its front side by the dump hydraulic actuator (not shown in FIG. 1). Latches (not shown) can also couple the folding portion 72 to the side face 69 and the fixed portion 71 of the front face 70 to contain a load in the dump body 8. Such latches can be released to permit the folding portion 72 of the front face 70 to fold downwardly to a position level with or lower than the floor portion 66 of the dump body 8. Both the tailgate 67 and the folding portion 72 of the front face 70 can be folded downwardly to permit elongated load objects longer than the dump body to be carried on the vehicle 1. The vehicle 1 can include dump body sockets 73 mounted to the chassis and coupled to the dump body 8. Such sockets are essentially tube-like in configuration. Through the use of balls mounted to the chassis and selectively coupled to appropriate pairs of sockets via selectively-inserted angled pins, the tilt direction can be controlled so that the dump body 8 will tilt in a predetermined direction, either to the rear, right or left side of the vehicle, upon activation of the dump hydraulic actuator. Hence, the dump body 8 can be used to discharge a load to the rear of the vehicle as well as on either side thereof.

The vehicle 1 can also include hangers 74 mounted to the front and/or rear ends of the chassis 12. The hangers 74 can each be configured as two spaced plates mounted to the chassis 2 and defining aligned eyes to permit coupling of one or more accessory tools to the chassis 2. The vehicle 1 can include a power-take-off (PTO) 75 mounted to the front of the chassis 2, and a PTO mounted to the rear end of the chassis 2. The PTOs are coupled to receive motive power generated by the vehicle's motor, optionally via pressurized hydraulic fluid generated by a hydraulic pump coupled to the motor. The PTOs can be used to supply motive power to one or more tools coupled to the chassis 2 via the hangers 74. Although not shown in FIG. 1, hydraulic couplers can also be mounted to the front and/or rear ends of the chassis 2 to permit coupling of hydraulic actuators of a tool to receive pressurized hydraulic fluid from the hydraulic pump of the vehicle 1 based on manipulation of control elements by the operator.

Figure 2:
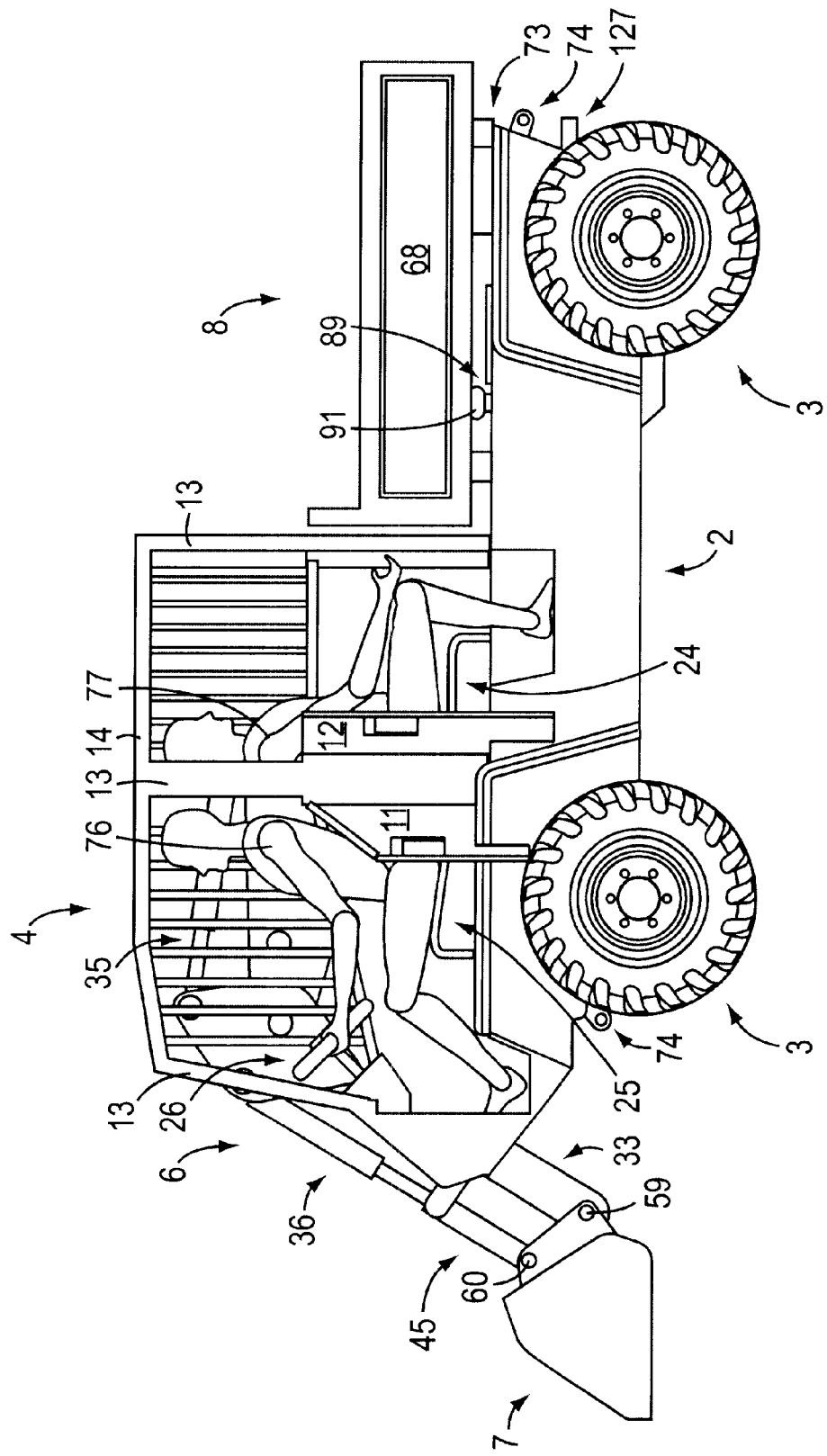
FIG. 2 is a side elevation view of the vehicle.

FIG. 2 shows the positioning of the operator 76 and the co-operator 77 during operation of the vehicle 1. The operator 76 is positioned on the front seat 25 facing forward to observe the area in front of the vehicle 1. The operator's position permits the operator to drive the vehicle and to control movement of the tool 7 via the turntable unit 5 and the boom unit 6, particularly if the tool is positioned to the front or right side of the vehicle. The co-operator 77 is positioned on the back seat 24 facing backwardly to permit the co-operator with a view of the dump body 8 as well as the tool 7 if positioned to the side or rear of the vehicle via the turntable unit 5 and the boom unit 6. The co-operator 77 can therefore clearly observe the position of the boom unit 6 and the tool 7 with respect to the dump body 8 to permit manipulation of control elements (not shown in FIG. 2) by either the operator 76 or the co-operator 77 to discharge a load from the tool 7 into the dump body 8. The co-operator 77 is also positioned with a clear view of areas to the rear and side of the vehicle to control the discharge of a load from the dump body 8 in a desired area to the rear or either side of the vehicle. The cabin 4 is accessible to the operator 76 and the co-operator 77 through front and rear doors 11, 12, respectively, which are hinged to center support 13.

In FIG. 2, the boom unit 6 has been shortened relative to FIG. 1, and a different tool 7, a loader bucket, has been coupled to the end thereof. More specifically, the arm 33 and attached plates 42, 43, actuator 37, link 45, levers 48, 49, and bolts 61, 62, 63, have been decoupled from the remainder of the boom unit 20 by uncoupling bolts 59, 60. The loader bucket serving as the tool 7 has spaced opposing plates mounted to the end thereof which define two spaced pairs of aligned apertures there through. The loader bucket is coupled to the boom unit 6 by positioning link 44 between the opposing plates of the loader bucket and inserting and tightening bolt 60 through the link 45 and the apertures defined in the plates of the loader bucket tool. The arm 33 is positioned between the loader bucket's opposing plates, and the bolt 59 is inserted through the apertures defined in the opposing plates of the loader bucket and the aperture defined in the arm 33, to couple such arm to the loader bucket tool 7.

2. Vehicle Hydraulic Systems for the Turntable Unit, Boom Unit, and Tool

Figure 3:
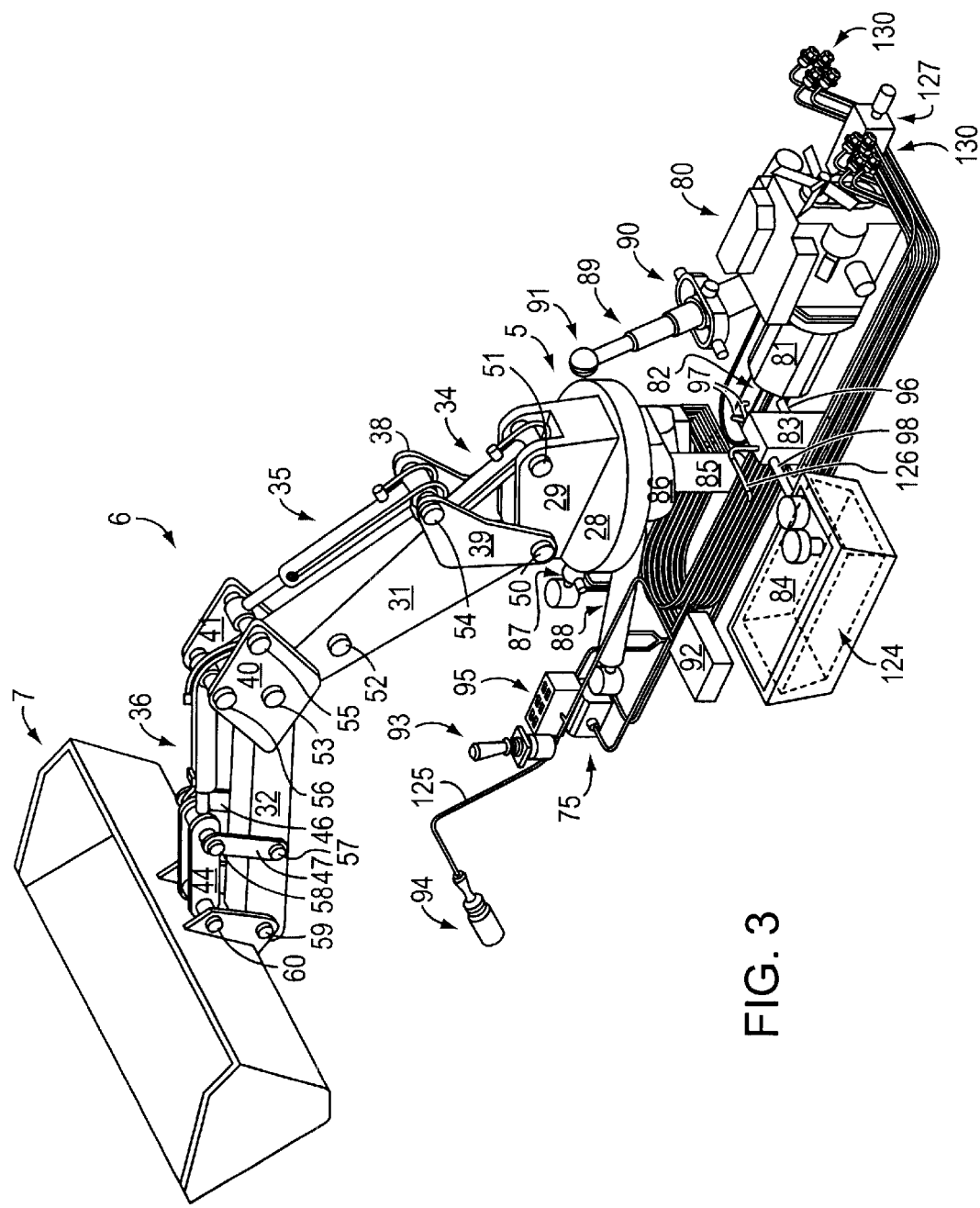
FIG. 3 is a first perspective view of a portion of the vehicle including a boom unit, turntable unit, dump actuator, and associated drive and control elements.
Figure 4:
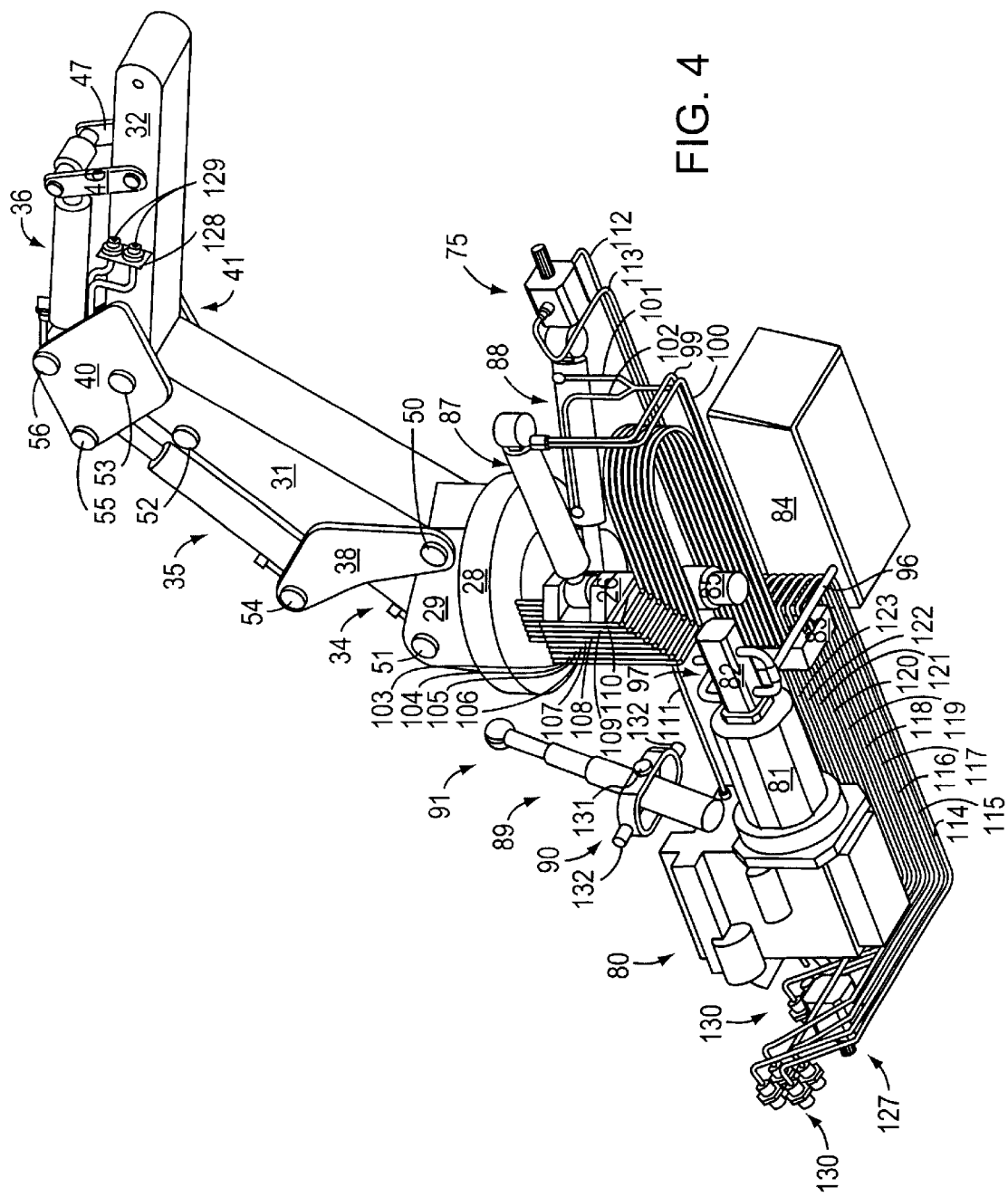
FIG. 4 is a second perspective view of the boom unit, turntable unit, dump actuator, and related drive and control elements.

The hydraulic system used to control and drive the turntable unit 5, the boom unit 6, and the tool 7, is now described with respect to FIGS. 3 and 4. As shown in FIG. 3, the vehicle 1 includes a power plant 80, hydraulic pumps 81, 82, a valve control block unit 83, and a hydraulic fluid reservoir 84. The vehicle 1 also includes shaft 85 with crank member 86, hydraulic actuators 87, 88, dump hydraulic actuator 89, yoke 90, and universal joint 91. The vehicle 1 further includes a controller 92, control sticks 93, 94, and switch unit 95. In addition, the vehicle 1 includes pipes 96–98, hoses 99–123, hydraulic fluid 124, electrically-conductive lines 125, 126, rear PTO 127, mounting plate 128, and universal couplers 129, 130. In general, the above-listed elements are coupled for support to and housed within or on the chassis 2, with the exception of the control sticks 93, 94 and the switch unit 95 which are mounted inside the cabin 4 where they are accessible to the operator and/or co-operator.

The power plant 80 can be a diesel or gasoline combustion engine, an electric motor, or other types of power plants. Such power plants are commercially-available from numerous manufacturers and suppliers. The power plant 80 includes a drive shaft (not shown) that is coupled to the hydraulic pump 81. The hydraulic pump 81 has a shaft (not shown) that is coupled to the power plant's drive shaft. The shaft of the hydraulic pump 81 is in turn coupled to drive the hydraulic pump 82. The hydraulic pumps 81, 82 can include one or more units such as the Type A10VG variable displacement pump or the Type 1PF2GC internal gear pump commercially-available from Brueninghaus Hydromatik GmbH, Elchingen, Germany. Such pump units can be coupled together for greater driving capacity if desirable for a particular application. The hydraulic pump 82 is coupled in communication with the hydraulic reservoir 84 to receive hydraulic fluid 124 stored in the reservoir via the pipe 96. The hydraulic pump 82 is also coupled in communication with the valve control block unit 83 via the pipes 97. Based on motive power supplied by the power plant 80 via the hydraulic pump 81, the hydraulic pump 82 receives and pressurizes the hydraulic fluid 124 from the reservoir 84 and supplies the pressurized hydraulic fluid to the valve control block unit 83 via the pipes 97. The valve control block unit 83 can be a unit such as the Type M7 or M8 control block commercially-available from Brueninghaus Hydromatik GmbH. The control sticks 93, 94 and the switches of switch unit 95 are electrically coupled to the controller 92 via respective lines 125. The control sticks 93, 94 and switch unit 95 can be programmable remote controls commercially-available from Brueninghaus Hydromatik GmbH. Based on signals generated by the control sticks 93, 94 and/or the switches of switch unit 95 under manipulation by the operator, the controller 92 generates at least one control signal. The controller 92 can include a microprocessor, microcontroller, or other processor, for example, commercially-available from numerous sources including Brueninghaus Hydromatik GmbH. The controller 92 is coupled to supply the control signal(s) to the valve control block unit 83 via the conductive line 126. The valve control block unit 83 is coupled in communication with the actuator 87 via hoses 99, 100, the actuator 88 via hoses 101, 102, the actuator 34 via hoses 103, 104, the actuator 35 via hoses 105, 106, the actuator 36 via hoses 107, 108, the actuator 37 or hydraulically-driven tool 7 (not shown in FIG. 3) via hoses 109, 110 and couplers 129, the actuator 89 via hoses 111, the front PTO 75 via hoses 112, 113, auxiliary couplers 130 via hoses 114–121, and the rear PTO 127 via the hoses 122, 123. Actuators 34–37, 87, 88 can be double-acting hydraulic cylinders, and actuator 89 can be a single-acting hydraulic cylinder. Such hydraulic cylinders are commercially-available from numerous sources such as Brueninghaus Hydromatik GmbH and others. Based on the control signal (s) received from the controller 92, the valve control block unit 83 controls the flow of pressurized hydraulic fluid from the pump 82 to the actuators 34–36, 87–89, as well as the return flow of hydraulic fluid from the actuators 34–36, 87–89 to the valve control block unit 83. The valve control block unit 83 is coupled in communication with the hydraulic reservoir 84 via pipe 98 to supply the return flow of hydraulic fluid from the actuators 34–37 (if used), actuators 87–89, the PTOs 75, 127, and/or couplers 129, 130, to the hydraulic reservoir.

The dump actuator 89 is coupled to the yoke 90 via pin 131. The dump actuator 89 can swivel about an axis parallel to the longitudinal axis LA. The yoke 90 has rockers 132 on opposite ends thereof. The rockers 132 are coupled to the chassis 2 in a manner that permits the yoke to rotate in a direction parallel to the width axis WA. The universal joint 91 is mounted to the end of the actuator 89, and meets with the underside of the floor portion 66 of the dump body 8 to force the dump body upwardly if the actuator 89 is activated by the operator's manipulation of the switch unit 95.

Figure 5:
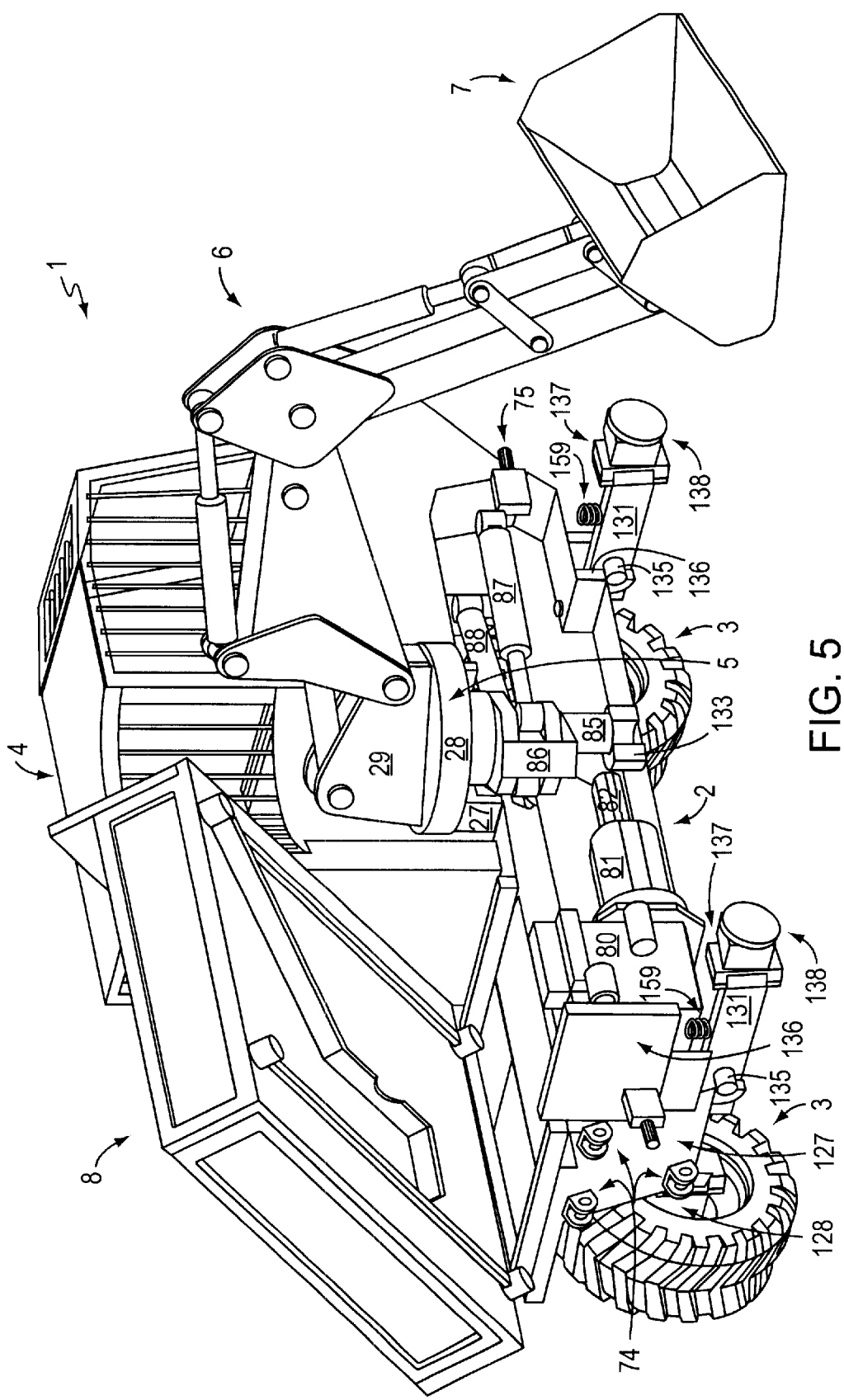
FIG. 5 is a cutaway perspective view of the vehicle generally showing the manner of mounting various elements of FIGS. 3 and 4 in the vehicle's chassis.

FIG. 5 shows preferred mounting of certain (not all) elements of the vehicle 1 within the chassis 2. The power plant 80 and the pumps 81, 82 are arranged from the rear to a central portion of the chassis 2. The turntable unit 5 is mounted to the upper surface of the chassis 2. More specifically, the lower part 27 of the turntable unit 5 is mounted the upper surface of the chassis 2 at a central portion thereof. The part 28 to which the boom unit's base 29 is mounted, rests upon bearings (not shown) situated between opposing surfaces of the parts 27, 28. Such bearings permit the part 28 to rotate smoothly relative to the part 27. The shaft 85 extends into the chassis 2 along the rotational axis RA and has an end coupled for rotation about rotational axis RA in holder 133 of the chassis 2 by bearings, for example. The crank member 86 is coupled between the shaft 85 and the part 28. First ends of the hydraulic actuators 87, 88 are pivotally coupled to the crank member 86. The second opposite ends of the hydraulic actuators 87, 88 are pivotally coupled to the chassis 2 at respective spaced positions in proximity to the front end of the chassis 2. The actuators 87, 88 serve to rotate the boom unit 6 about the rotational axis RA by exerting torque against the crank member 86, the shaft 85 and the part 28. The PTO 75 is mounted to and extends through the front end of the chassis 2, and the PTO 127 is mounted to and extends through the rear end of the chassis 2. The hangers 138 at the rear end of the chassis 2 are also visible in FIG. 5. As shown in FIG. 5, the vehicle 1 includes front and rear axles 134 (only the front axle 134 is shown) having rockers 135, mounting plates 136, swivel parts 137 (only one of which can be seen in FIG. 5), springs or shock absorbers 190, and hydraulic motors 138. The mounting plates 136 are attached to or formed integrally with the chassis 2 and are arranged in a spaced, opposing relationship. The axle 134 is situated between the plates 136 and is pivotally mounted thereto by rockers 135, which extend through apertures in the mounting plates 136. The axle 134 can rotate the rockers 135 about a rotational axis parallel to the longitudinal axis LA. The swivel parts 137 are mounted to opposite ends of the axle 134 so that such swivel parts can rotate relative to the end of the axle 134. Hydraulic motors 138 are coupled to respective swivel parts 137 to drive the front wheels 3 to turn. The rear axle assembly is configured similarly to the front axle assembly, with the exception that the rear hydraulic motors 138 are mounted directly to the ends of the rear axle 134 without the use of the swivel parts 137 which are required only at the front axle to steer the vehicle 1. Springs or shock absorbers 159 are coupled between outer portions of the front and rear axles 134 and the chassis 2 so that the axle 134 is evenly biased about the rockers 135. Further details pertaining to the steering and drive units of the vehicle 1 are provided in a subsequent section of this document.

Figure 6:
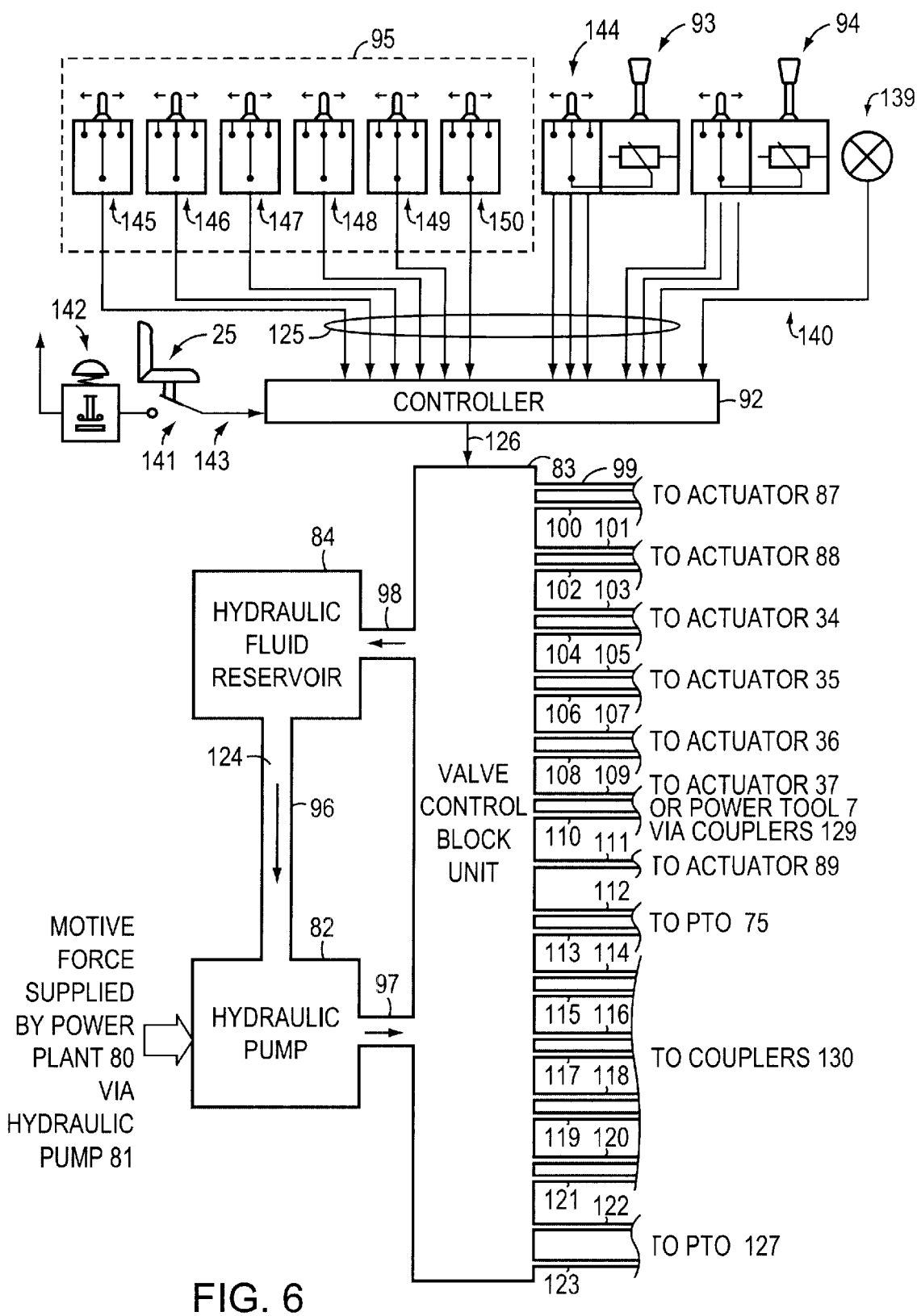
FIG. 6 is a schematic view of a controller and related elements for driving the turntable unit, the boom unit, and tool(s) coupled to the vehicle.

3. Detailed Description of Vehicle's Control Unit for the Turntable Unit, Boom Unit and Tool In FIG. 6, the controller unit for the turntable unit 5, the boom unit 6, and the tool 7, is shown in further detail. As shown in FIG. 6, the vehicle 1 includes a control key switch 139 that is coupled via electrically-conductive line 140 to supply a control key signal to the controller 92. The control key switch 139 can be the ignition switch of the vehicle, for example, coupled to start the power plant 80 in addition to activating the controller 92 so that the turntable unit 5, the boom unit 6, and the tool 7 can be moved via respective hydraulic actuators under power supplied by the power plant. The controller 92 is activated to permit movement of the hydraulic actuators of the turntable unit 5, the boom unit 6, and the tool 7, based on the state of the control key switch signal. More specifically, the control key switch 139 generates an activated control key signal if the key of the vehicle 10 has been inserted into the switch 139 and turned. On the other hand, if the control key has not been inserted into the switch 139 and turned, the control key signal is in a deactivated state so that the controller 92 is likewise deactivated to prevent movement of the turntable unit 5, the boom unit 6, and the tool 7. The control key switch 139 can thus be used to prevent operation of the vehicle 10 by persons other than an authorized operator possessing the control key.

As a further safety precaution, the vehicle 10 can include a seat switch 141 and an emergency stop switch 142 coupled in series along electrically-conductive line 143 between an electric power supply such as the vehicle's battery and/or alternator (not shown), and the controller 92. The seat/emergency switch signal generated by the power supply on line 143 and supplied to the controller 92 is in an activated state only if the operator is seated in the seat 25 to close the switch 141 and the emergency stop switch 142 has not been depressed and is therefore in a closed state. On the other hand, if the operator is not seated in the seat 25 so that the switch 141 is open, and/or if the emergency stop switch 142 is depressed so that such switch is open, the seat/emergency switch signal is in a deactivated state so that the controller 92 is likewise deactivated and cannot move the turntable unit 5, the boom unit 6 or the tool 7 via the hydraulic actuators. The seat switch 141 and the emergency stop switch 142 ensure that the vehicle cannot be operated unless the driver is seated. The emergency stop switch 142 can be activated by the operator or other person to cease further movement of the turntable unit 5, the boom unit 6, and the tool 7 in the event of a dangerous condition necessitating cessation of further movement of such elements.

As shown in FIG. 6, the power plant 80 supplies motive force to the hydraulic pump 82 via the hydraulic pump 81. The hydraulic pump 82 is coupled in communication with the hydraulic fluid reservoir 84 via pipe 96. The reservoir 84 contains a relatively large quantity of hydraulic fluid. The pump 82 receives hydraulic fluid 124 via pipe 96, and pressurizes the hydraulic fluid based on motive force supplied by the power plant 80. The valve control block unit 83 is coupled in communication with the hydraulic pump 82 via the pipe 97 to receive pressurized hydraulic fluid from the pump 82. Based on the control signal generated by the controller 92 on line 126, the valve control block unit 83 selectively couples hydraulic hoses 99–123 in communication with the pump 82 to receive pressurized hydraulic fluid from such pump. The valve control block unit 83 is also coupled in communication with the reservoir 84 via the pipe 98. Based on the control signal generated by the controller 92 on the line 126, the valve control block unit 83 selectively couples lines 99–123 in communication with the reservoir 84. The valve control block unit 83 thus generally functions to supply pressurized hydraulic fluid to and to receive hydraulic fluid from the actuators 34–36, actuator 37 or power tool 7, actuators 87–89, PTOs 75, 127, and hydraulically-driven accessories coupled in communication with the couplers 130.

Also shown in FIG. 6, the vehicle 1 includes control sticks 93, 94. In addition, the vehicle 1 includes a switch 144 associated with the control switch 93, a second switch associated with the control switch 94 which is not used and which therefore is not numbered, and switches 145–150 included within the switch unit 95. The control sticks 93, 94 and the switches 145–150 are coupled to the controller 92 via respective electrically-conductive lines collectively referred to as the lines 125. The operator manipulates the control sticks 93, 94 and the switches 145–150 to generate signals supplied from such elements to the controller 92. Based on the signals generated by the control sticks 93, 94 and the switches 145–150 under the operator's manipulation thereof, the controller 92 generates the control signal supplied to the valve control block unit 83 to affect movement of the turntable unit, boom unit, tool, the dump body, the PTOs, and any accessory tool(s), as desired by the operator. More specifically, the operator manipulates the control sticks 93, 94 and the switches 145–150 to control movement of one or more of the actuators 34–36, actuator 37 or power tool 7, actuators 87–89, PTOs 75, 127, and hydraulically-driven accessories coupled in communication with the couplers 130. The control sticks 93, 94 can be such that they are joysticks or the like which are spring-biased with respect to the horizontal direction as well as the frontward/backward direction relative to the seated operator so as to be at horizontally and frontward/backward neutral positions in the absence of the application of force to such sticks by the operator. To activate the control stick 93, such control stick can be manipulated in a horizontal, i.e., right/left direction relative to the seated operator to generate a signal supplied to the controller 92. Based on such signal, the controller 92 generates a control signal supplied to the valve control block unit 83 to control flow of hydraulic fluid to extend or retract the hydraulic actuators 87, 88 to turn the turntable unit 5 and attached boom unit 6 about the rotational axis RA. The control stick 93 can also be moved along the forward/backward direction relative to the seated operator to generate a signal supplied to the controller 92. Based on such signal, the controller 92 generates a control signal supplied to the valve control block unit 83 to control the flow of hydraulic fluid to extend or retract actuator 37 to open or close the tool 7 or to supply hydraulic fluid to drive a hydraulically-driven power tool coupled to the end of the boom unit 6 via couplers 129. The control stick 94 can be moved along the horizontal or right/left direction from the perspective of the seated operator to generate a signal supplied to the controller 92. Based on such signal, the controller 92 generates a control signal supplied to the valve control block unit 83 to cause hydraulic fluid to flow to extend or retract the actuator 36. In the case in which the dipper bucket is used as the tool 7, the movement of the actuator 36 affects bending or stretching of the arms 32, 33 relative to one another. In the case of the loader bucket tool 7 being attached to the arm 32 without using the arm 33, the movement of the actuator 36 affects opening or closing of the loader bucket. The control stick 94 can also be moved along a vertical or forward/backward direction relative to the operator. The resulting signal from the control stick 94 is received by the controller 92 via a respective line 125. Based on such signal, the controller 92 generates a control signal supplied to the valve control block unit 83 to control flow of hydraulic fluid to extend or retract the actuator 35. The movement of the actuator 35 controls relative bending or stretching of the arms 31, 32. The operator can further manipulate the switch 144 associated with the control stick 93, causing the switch 144 to generate a signal supplied to the controller 92. Based on such signal, the controller 92 generates a control signal supplied to the valve control block unit 83 to control the flow of hydraulic fluid to extend or retract the hydraulic actuator 35. The movement of the hydraulic actuator 35 pivots the arm 31 relative to the base 29.

The switches 145–150 of the switch unit 95 can be manipulated by the operator to activate respective signals which are supplied to the controller 92. In the absence of finger pressure applied by the operator, the switches 145–150 are spring-biased to a position in which respective signals generated by such switches are deactivated so that the controller 92 generates no control signal unless directed pressure is applied to the switches 145–150 by the operator. The switches 145–150 can be used to affect the following actions. In response to activation of the signal from the switch 145 by manipulation of the operator, the controller 92 generates a control signal supplied to the valve control block unit 83 to control the flow of hydraulic fluid to the front and rear PTOs 75, 127, causing them to turn and supply motive power to any accessory tool attached thereto. In response to activation of the signal from the switch 146 by manipulation of the operator, the controller 92 permits activation of either or both of the switches 147, 148. If the switches 146, 147 are activated, the controller 92 generates the control signal supplied to the valve control block unit 83 to control hydraulic fluid flow to a first set of the couplers 130 to move hydraulic actuators associated with a rear-attached accessory tool (not shown in FIG. 6) upwardly above the ground upon which the vehicle 10 rests. If the switches 146, 148 are activated, the controller 92 generates the control signal supplied to the valve control block unit 83 to control hydraulic fluid flow to the first set of the couplers 130 to move the hydraulic actuators associated with the rear-attached accessory tool downwardly to rest upon the ground. If the switch 149 is activated by manipulation of the operator, such switch generates a signal supplied to the controller 92 which in turn generates a control signal supplied to the valve control block unit 83 to control the flow of hydraulic fluid to a second set of the couplers 130. The second set of couplers 130 can be used to drive a hydraulically-actuated power tool accessory attached to the rear of the vehicle 10. The switch 150 can be activated by manipulation of the operator to activate a signal supplied to the controller 92 which in turn generates a control signal supplied to the valve control block unit 83 to control the flow of hydraulic fluid to the dump hydraulic actuator 89 which extends to tilt the dump body 8 and dump any load therein.

The operation of the controller 92 to affect control of the turntable unit 5, the boom unit 6, the tool 7, the dump body 8, the PTOs 75, 127, and any coupled accessory tool, is now explained with reference to FIG. 6 and the flow chart of FIGS. 7A–7G. The controller 92 can be a microcontroller, programmable logic array (PLA), field programmable logic array (FPLA), programmed array logic (PAL), or microprocessor, for example, coupled to receive the signals generated by the control sticks 93, 94 and the switches 145–150 via the lines 125 as well as the control key signal on the line 140 and the seat/emergency stop switch signal on the line 143. The microcontroller, PLA, FPLA, PAL, or microprocessor is also coupled to supply the control signal generated based on the signals from the control sticks 93, 94 and the switches 145–150, to the valve control block unit 83 via the line 126. If the controller 92 is implemented as a microcontroller, PLA, FPLA, or PAL, the control program for such device can be prestored in its gate or logic array before operation of such device. If the controller 92 is implemented as a microprocessor, such controller can include a memory coupled to the microprocessor. The microprocessor's memory can be used to prestore the control program and data as well as data generated by the microprocessor in operation thereof. The processing performed by the controller 92 under its control program is set forth below with respect to FIGS. 7A–7G.

Figure 7A:
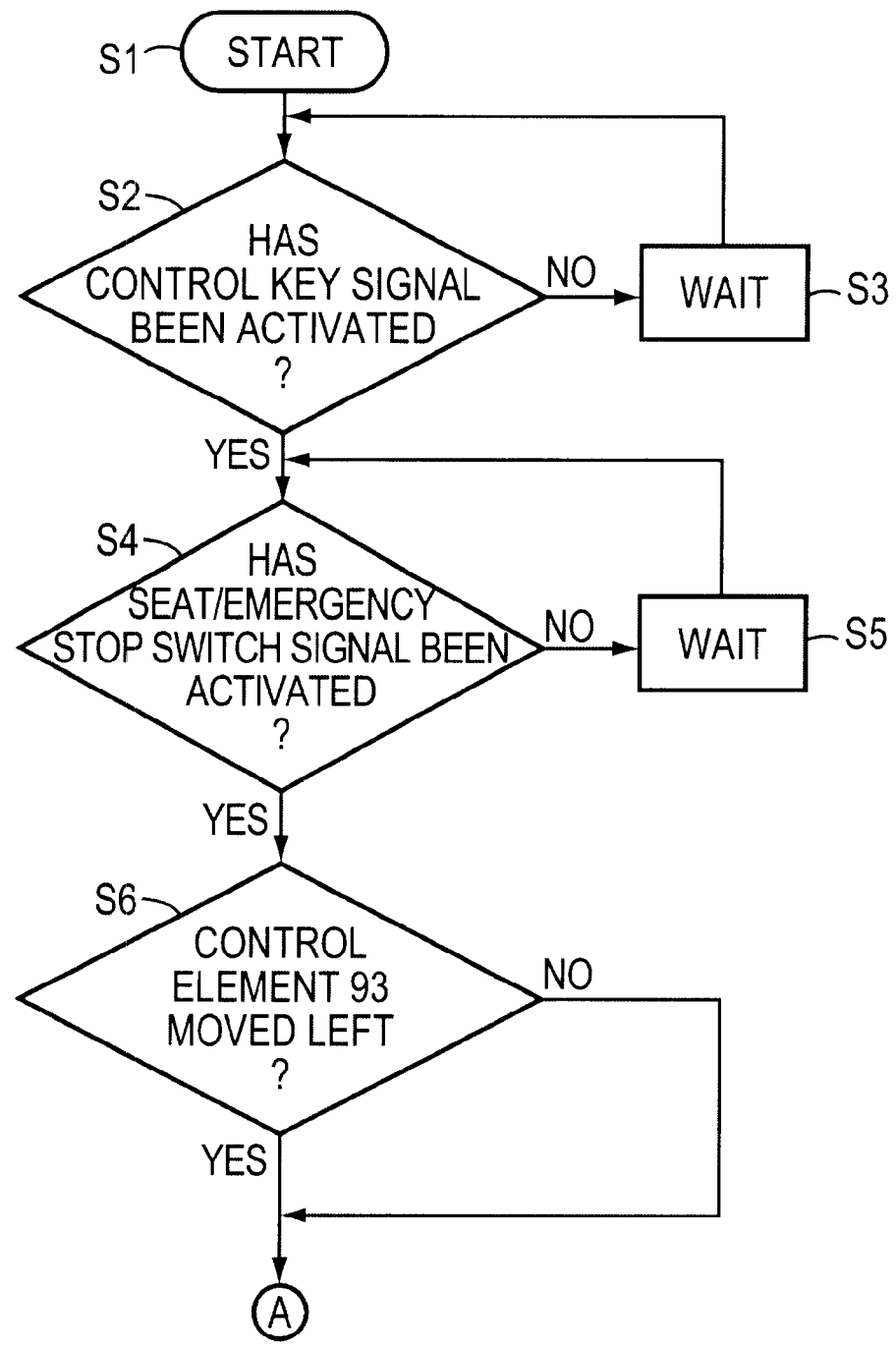
FIGS. 7A–7G are flowcharts of processing performed by the controller related to the boom unit, turntable unit, dump actuator and other elements.
Figure 7B:
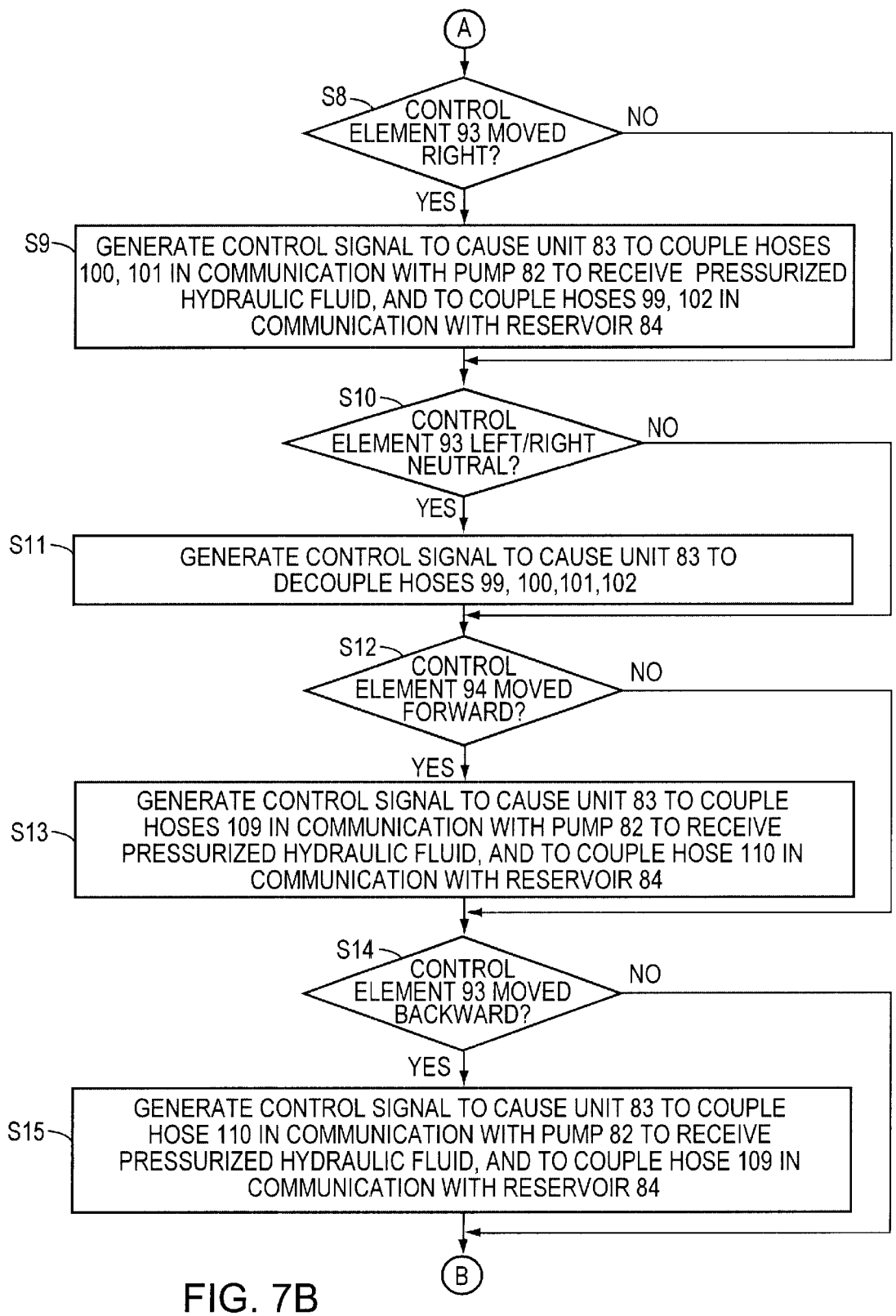
Figure 7C:
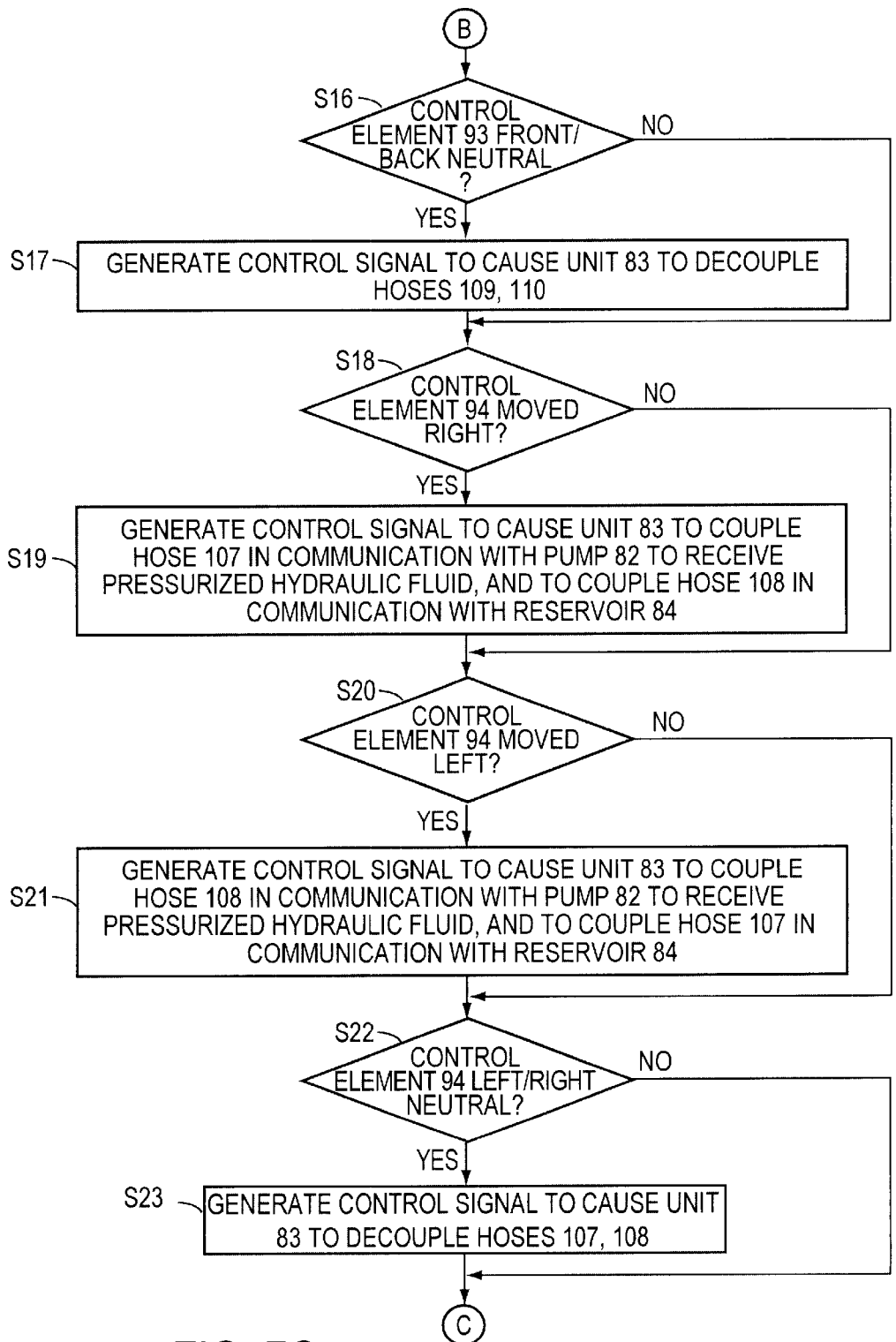
Figure 7D:
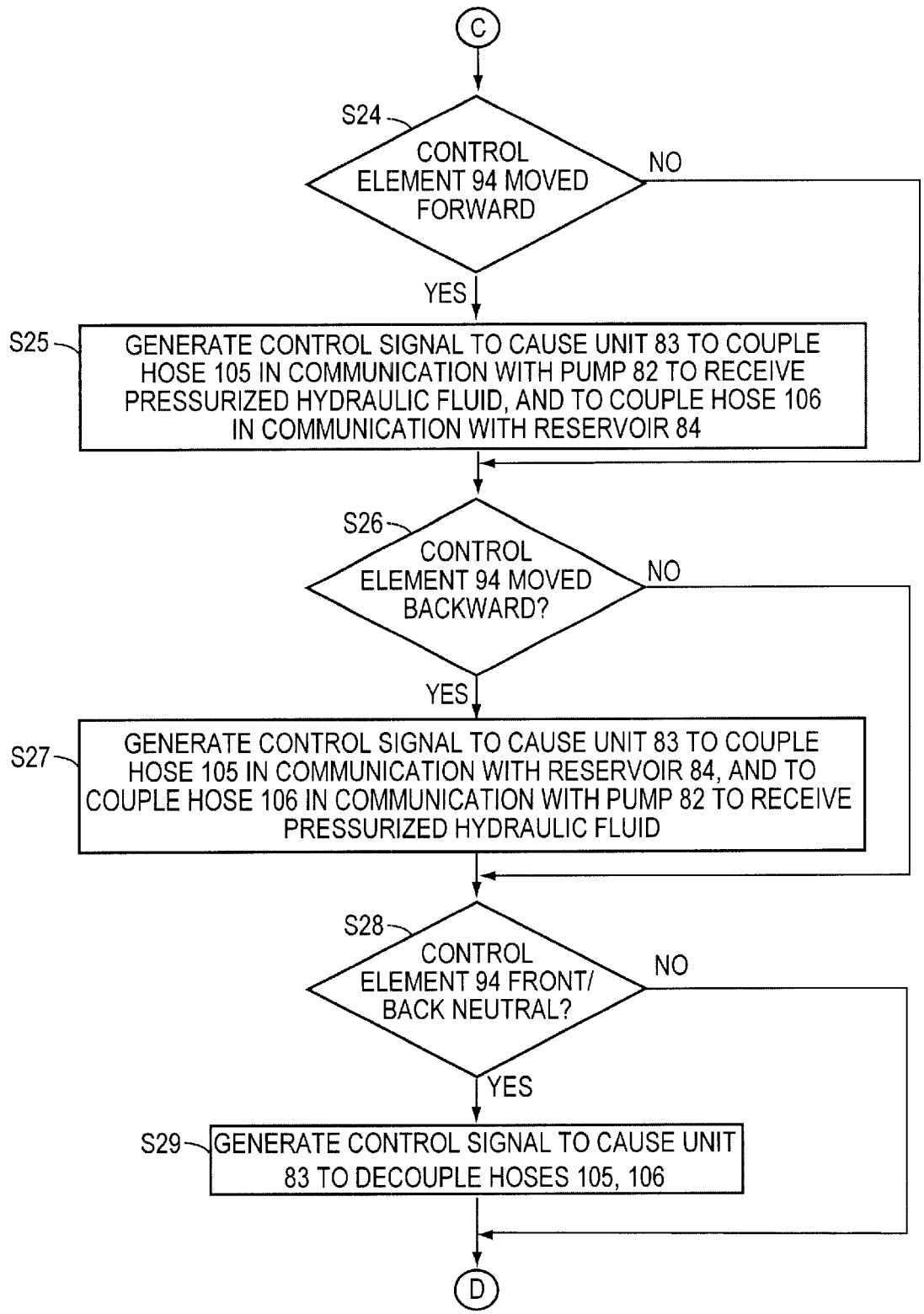
Figure 7E:
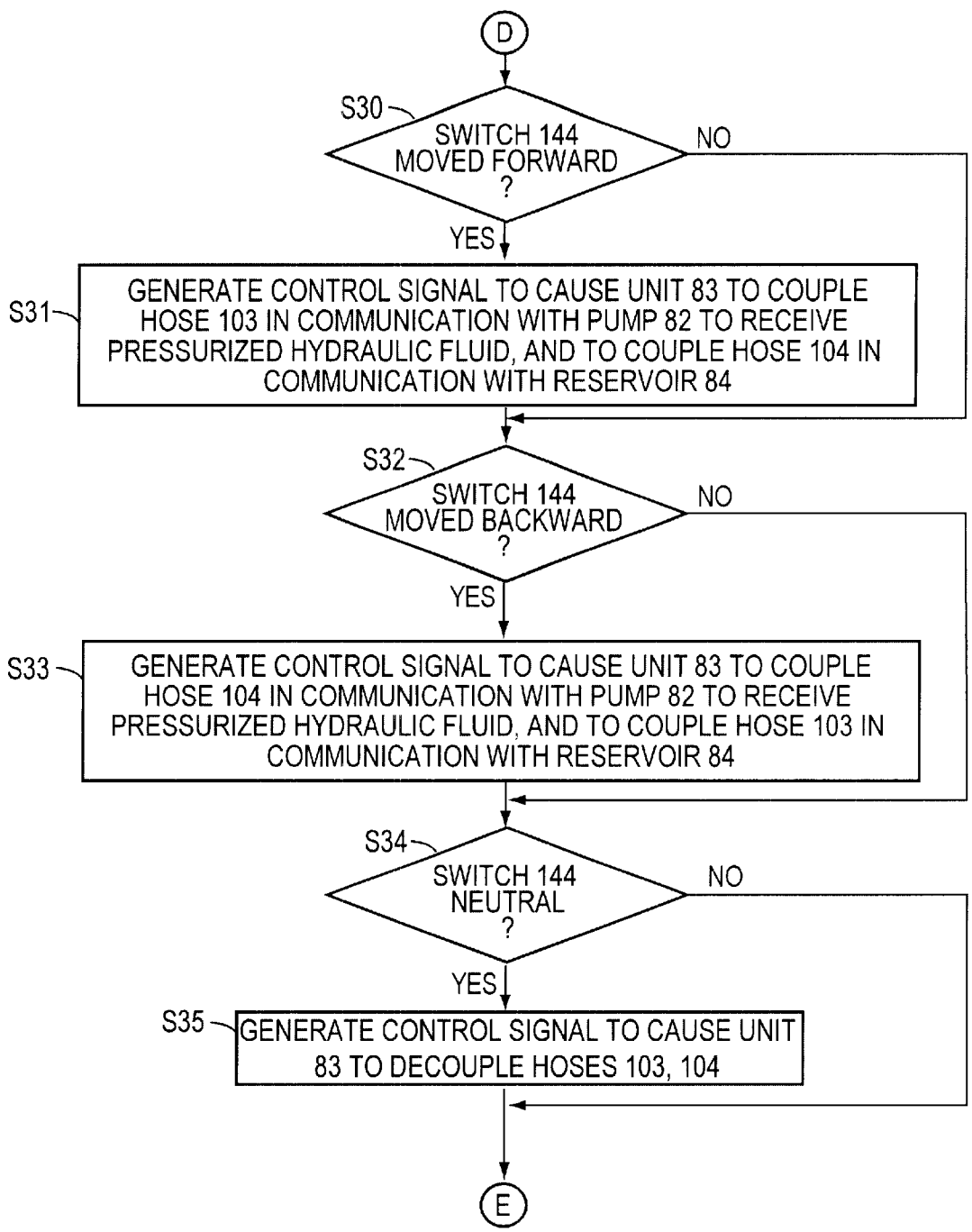
Figure 7F:
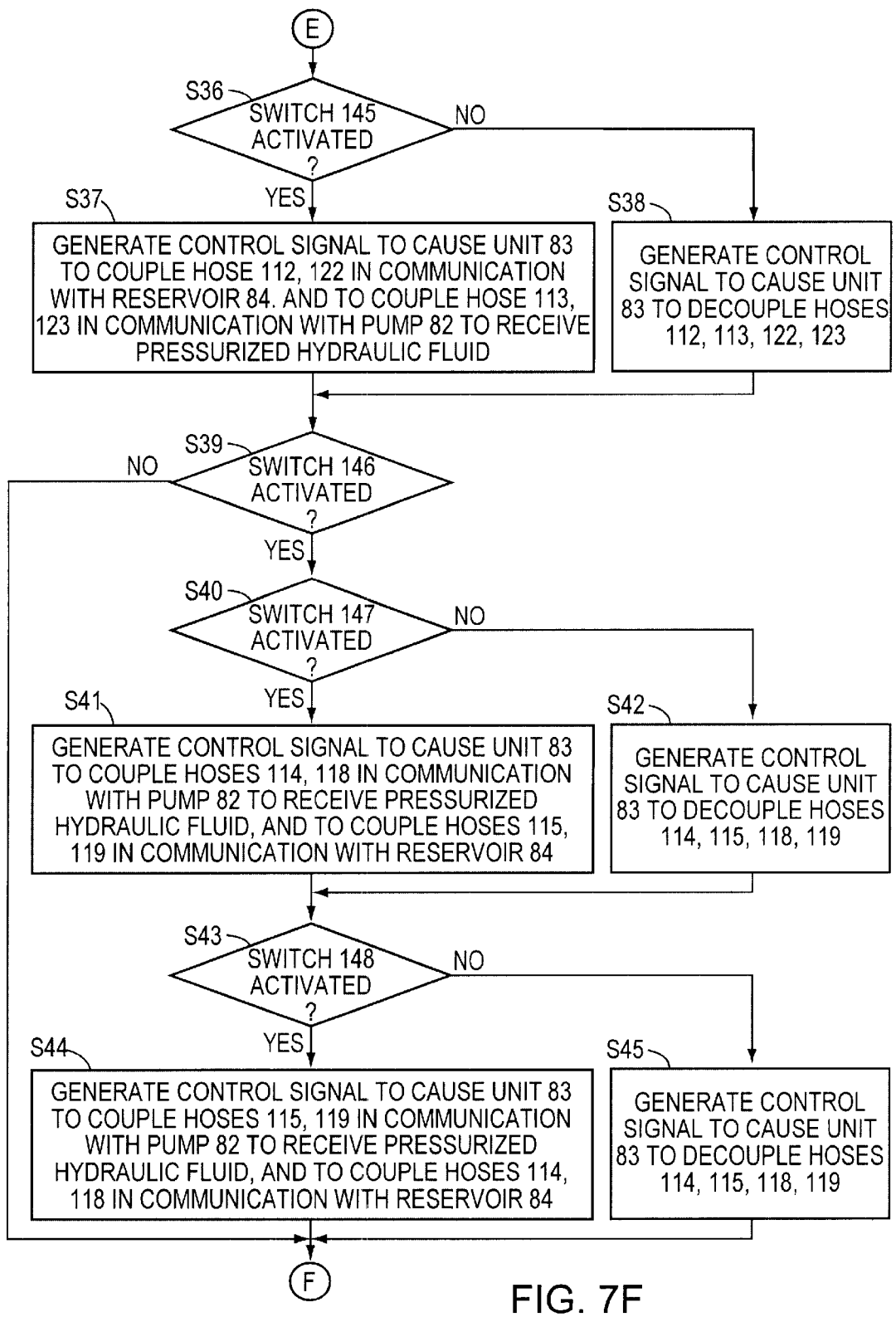
Figure 7G:
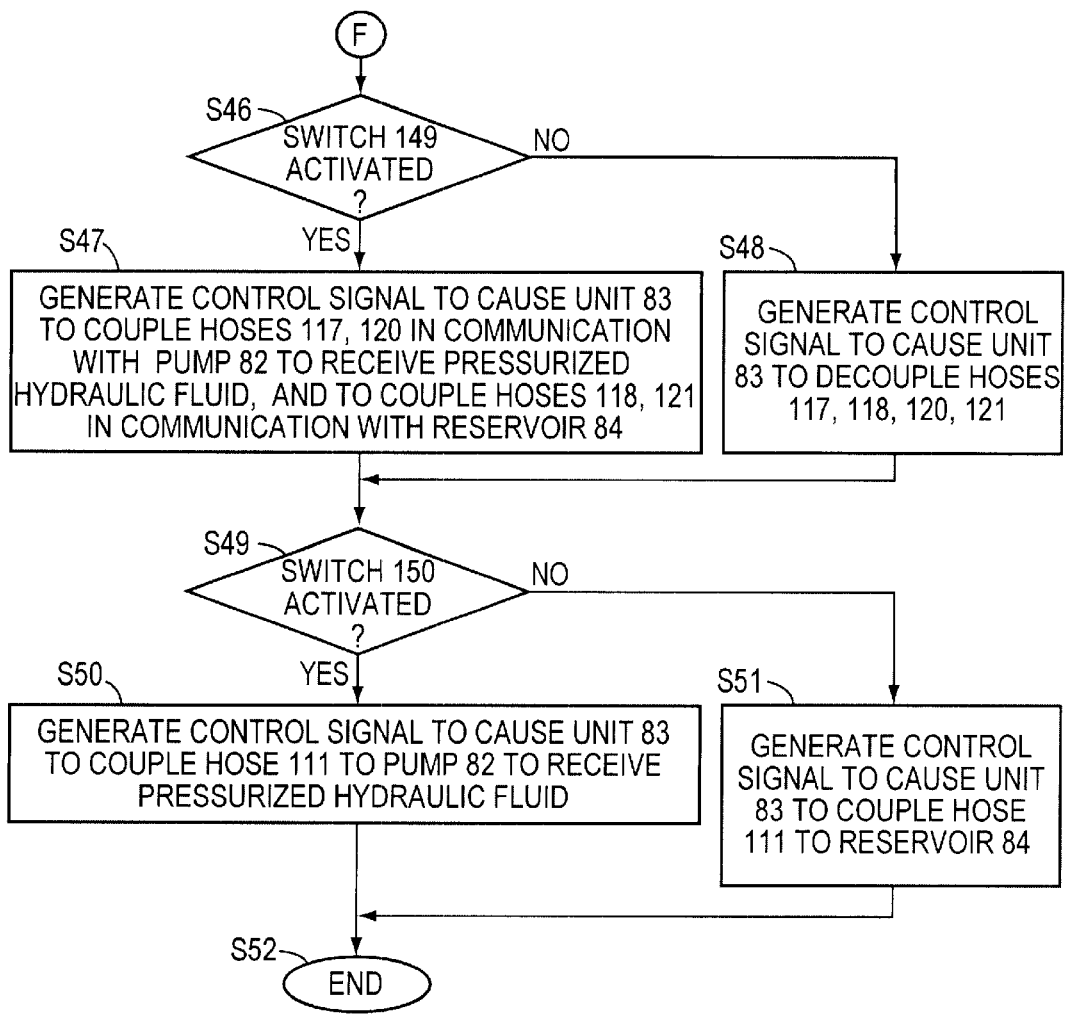

In FIG. 7A, processing performed by the controller 92 in executing its control program begins in step S1. In step S2 of FIG. 7A, the controller 92 determines whether the control key signal on line 140 has been activated by insertion and turning of the vehicle's key in the switch 139. If not, in step S3, the controller waits for a predetermined period of time on the order of one-hundredth to one-tenth of a second or less and repeats performance of step S2. If the determination in step S2 is affirmative, in step S4, the controller 92 determines whether the seat/emergency switch signal on line 143 has been activated. If not, in step S5, the controller 92 waits for a predetermined period of time on the order of one-hundredth to one-tenth of a second, and repeats the performance of step S4. If the determination in step S4 is affirmative, in step S6, the controller 92 determines whether the control stick 93 has generated a signal indicating that it has been deflected to the left of its horizontally-neutral position by the operator. If so, in step S7, the controller 92 generates a control signal based on the signal indicating deflection of the control stick 93 to the left of neutral. The controller 92 supplies the control signal to the valve control block unit 83 to cause such unit to couple hoses 99, 102 in communication with the hydraulic pump 82 to receive pressurized hydraulic fluid 124, and couples hoses 100, 101 in communication with the reservoir 84. The coupling of the hoses 99–102 in this manner in step S7 causes the hydraulic actuator 87 to extend and the hydraulic actuator 88 to retract and drive crank member 86 to rotate shaft 85 and part 28 of the turntable unit 5 in a clockwise direction as viewed from a top plan perspective looking downward at the upper surface of the vehicle 10. Because the boom unit 6 is mounted to the base 29 on the part 28, the boom unit also turns in a clockwise direction. In step S8, the controller 92 determines whether the control stick 93 has generated a signal indicating that such element has been moved to the right of neutral by the operator. After performance of step S7 or if the result of the determination in step S6 is negative, the controller 92 proceeds to the performance of step S8 of FIG. 7B. In step S8, the controller 92 determines whether the control stick 93 has generated a signal indicating that such control stick has been moved by the operator to the right of its neutral position. If so, in step S9, the controller 92 generates the control signal based on the received signal indicating that the control stick 93 has been moved to the right of neutral. The control signal generated in step S9 is supplied to the valve control block unit 83 to couple hoses 100, 101 in communication with the pump 82 to receive pressurized hydraulic fluid. The control signal generated in step S9 also causes the valve control block unit 83 to couple hoses 99, 102 in communication with the reservoir 84. The coupling of the hoses 99–102 in this manner in step S9 causes the hydraulic actuator 87 to retract and the hydraulic actuator 88 to extend and drive crank member 86 to rotate shaft 85 and part 28 of the turntable unit 5 in a counter-clockwise direction as viewed from a top plan perspective looking downward along the rotational axis RA toward the upper surface of the vehicle 10. Because the boom unit 6 is mounted to the base 29 on the part 28, the boom unit also turns in a counterclockwise direction. After performance of step S9 or if the determination of step S8 is negative, in step S10, the controller 92 determines whether the control stick 93 is in a neutral position with respect to the left-right axis thereof. If so, in step S11, the controller 92 generates the control signal supplied to the valve control block unit 83 to cause such unit to decouple the hoses 99–102. After performance of step S11 or if the determination in step S10 is negative, in step S12, the controller 92 determines whether the control stick 93 has generated a signal indicating that such control stick has been moved by the operator in a direction forward relative to its front/back neutral position. If so, in step S13, the controller 92 generates a control signal based on the signal from the control stick 93, that is supplied to the valve control block unit 83. Based on the control signal generated by the controller 92 in step S13, the valve control block unit 83 couples the hose 109 in communication with the pump 82 to receive pressurized hydraulic fluid, and couples the hose 110 in communication with the reservoir 84. Such coupling can either cause hydraulic fluid to flow and extend the actuator 37 to close the dipper bucket tool 7 or to cause hydraulic fluid to flow to drive a hydraulically-driven power tool coupled to the end of the boom unit 6 via couplers 129. After performance of step S13 or if the determination in step S12 is negative, processing performed by the controller 92 proceeds to step S14. In step S14, the controller 92 determines whether the control stick 93 has been moved backward relative to its neutral position along the frontward/backward direction. If so, in step S14, the controller 92 generates a control signal based on the signal indicating that the control stick 93 has been moved backward, and supplies such control signal to the valve control block unit 83. Based on such control signal, the valve control block unit 83 couples hose 110 in communication with pump 82 to receive pressurized hydraulic fluid, and couples hose 109 in communication with the reservoir 84. Such coupling can either cause hydraulic fluid to flow and retract the actuator 37 to open the dipper bucket tool 7 or can cause hydraulic fluid to flow to drive a hydraulically-driven power tool coupled to the end of the boom unit 6 via couplers 129. After performance of step S15 or if the determination in step S14 is negative, in step S16 of FIG. 7C, the controller 92 determines whether the control stick 93 has generated a signal indicating that the control stick 93 is in a neutral position with respect to the forward/backward direction of movement of such control stick. If so, in step S17, the controller 92 generates a control signal to cause the valve control block unit 83 to decouple the hoses 109, 110 from communication with the pump 82 and the reservoir 84 so that the actuator 37 or power tool 7 are deactivated. After the performance of step S17 or if the determination of step S16 is negative, in step S18, the controller 92 determines whether a signal has been generated by the control stick 94 indicating that such element has been moved to the right relative to the neutral position along the right/left direction of movement of the control stick 94. If so, in step S25, the controller 92 generates a control signal to cause the valve control block unit 83 to couple hose 107 in communication with the pump 82 to receive pressurized hydraulic fluid and to couple the hose 108 in communication with the reservoir 84. Such coupling of the hoses 107, 108 causes the actuator 36 to extend and bend arm 33 relative to the arm 32, or to raise the tool 7 if attached to the end of the arm 32 in place of the arm 33. In step S20, the controller 92 determines if the control stick 94 has generated a signal indicating that such control stick has been moved to the left relative to neutral along the right/left direction of movement of the control stick 94. If so, in step S20, the controller 92 generates a control signal to cause the valve control block unit 83 to couple the hose 108 in communication with the pump 82 to receive pressurized hydraulic fluid, and to couple hose 107 in communication with the reservoir 84. Such coupling of the hoses 107, 108 causes the actuator 36 to retract and stretch the arm 33 outwardly relative to the arm 32, or to lower the tool 7 if attached to the end of the arm 32 in place of the arm 33. After performance of step S21 or if the determination of step S20 is negative, in step S22, the controller 92 determines whether the control stick 94 has generated a signal indicating that such element is in a neutral position with respect to the left/right direction of movement of such control stick. If so, in step S23, the controller 92 generates the control signal to cause the valve control block unit 83 to decouple the hoses 107, 108 from either the pump 82 or the reservoir 84 so that further movement of the actuator 36 is stopped. After the performance of step S23 or if the determination of step S22 is negative, in step S24 of FIG. 7D, the controller 92 determines whether the control stick 94 has generated a signal indicating that the control stick 94 has been moved forward relative to the neutral position along the forward/backward direction of movement of such element. If so, in step S25, the controller 92 generates the control signal supplied to the valve control block unit 83 to couple the hose 105 in communication with the pump 82 to receive pressurized hydraulic fluid, and to couple the hose 106 in communication with the reservoir 84. Such coupling of the hoses 105, 106 causes the actuator 35 to extend and bend arm 32 relative to arm 31. After performance of step S25 or if the determination of step S24 is negative, in step S26, the controller 92 determines whether the control stick 94 has generated a signal indicating such element has been moved by the operator backwardly of its neutral position with respect to the forward/backward direction of movement of such control stick. If so, in step S27, the controller 92 generates the control signal to cause the valve control block unit 83 to couple hose 105 in communication with the reservoir 84, and to couple the hose 106 in communication with the pump 82 to receive pressurized hydraulic fluid. Such coupling of the hoses 105, 106 in step S27 causes the actuator 35 to retract and stretch arm 32 relative to arm 31. In step S28, the controller 92 determines whether the control stick 94 has generated a signal indicating that the control stick 94 is in a neutral position with respect to the frontward/backward direction of movement of such control stick. If so, in step S29, the controller 92 generates a control signal to cause the valve control block unit 83 to decouple hoses 105, 106 from the pump 82 and the reservoir 84, an action which ceases movement of the actuator 35. In step S30 of FIG. 7E, the controller 92 determines whether a signal has been generated by the switch 144 indicating that the operator has moved such switch in a forward direction. If so, in step S31, the controller 92 generates a control signal supplied to the valve control block unit 83 to couple the hose 103 in communication with the pump 82 to receive pressurized hydraulic fluid, and to couple the hose 104 in communication with the reservoir 84. Such coupling of the hoses 103, 104 causes the actuator 34 to extend and pivot arm 31 downwardly relative to the base 29. After performance of step S31 or if the determination in step S30 is negative, in step S32, the controller 92 determines whether the switch 144 has generated a signal indicating that the operator has moved the switch 141 backwardly relative to its neutral position along the forward/backward direction. If so, in step S33, the controller 92 generates a control signal to cause the valve control block unit 83 to couple the hose 104 in communication with the pump 82 to receive pressurized hydraulic fluid, and to couple the hose 103 in communication with the reservoir 84. Such coupling of the hoses 103, 104 causes the actuator 34 to retract, moving the arm 31 upwardly relative to the base 29. In step S34, the controller 92 determines whether the switch 144 has generated a signal indicative of such switch being positioned in a neutral position with respect to the forward/backward direction of movement of the switch 144. If so, in step S35, the controller 92 generates a control signal to cause the valve control block unit 83 to decouple the hoses 103, 104, ceasing movement of the actuator 34. After performance of step S35 or if the determination in step S34 is negative, in step S36 of FIG. 7F, the controller 92 determines whether a signal has been activated by manipulation of the switch 145 by the operator. If so, in step S37, the controller 92 generates a control signal supplied to the valve block control unit 83 to cause such unit to couple hoses 112, 122 in communication with the reservoir 84, and to couple the hose 113, 123 in communication with the pump 82 to receive pressurized hydraulic fluid. Such coupling of the hoses 112, 113, 122, 123 causes hydraulic fluid to flow through the PTOs 75, 127 to cause them to turn to supply torque to drive any attached accessory tool. On the other hand, if the determination of step S36 is negative, in step S38, the controller 92 generates the control signal supplied to the valve control block unit 83 to cause such unit to decouple the hoses 112, 113, 122, 123 to cease powered movement of the PTOs 75, 127. After the performance of steps S37 or S38, in step S39, the controller 92 determines whether a signal indicative of the operator's activation of the switch 146 has been generated by such switch. If so, in step S40, the controller 92 determines whether a signal indicative of the activation of the switch 147 by the operator has been generated by such switch. If so, in step S41, the controller 92 generates a control signal to cause the valve control block unit 83 to couple the hoses 114, 118 in communication with the pump 82 to receive pressurized hydraulic fluid, and to couple hoses 115, 119 in communication with the reservoir 84. Such coupling of the hoses 114, 115, 118, 119 can be used to extend hydraulic actuators coupled to respective couplers 130 for an accessory tool attached at the rear of the vehicle to lower same. On the other hand, if the determination in step S40 is negative, in step S42, the controller 92 generates a control signal supplied to the valve block control unit 83 to decouple the hoses 114, 115, 118, 119 to cease movement of such accessory tool's actuators. After performance of either of steps S41 or S42, in step S43, the controller 92 determines whether a signal has been activated by the switch 148 under manipulation by the operator. If so, in step S44, the controller 92 generates a control signal to cause the valve control block unit 83 to couple hoses 115, 119 in communication with the pump 82 to receive pressurized hydraulic fluid, and to couple hoses 114, 118 in communication with the reservoir 84. Such coupling of the hoses 114, 115, 118, 119 can be used to retract hydraulic actuators coupled to the accessory tool via respective couplers 130 to raise such accessory tool above the ground. On the other hand, if the determination in step S43 is negative, in step S45, the controller 92 generates a control signal to cause the valve control block unit 83 to decouple the hoses 114, 115, 118, 119. After the performance of either of steps S44 or S45, in step S46 of FIG. 7G, the controller 92 determines whether the switch 149 has activated its signal under manipulation by the operator. If so, in step S47, the controller 92 generates a control signal supplied to the valve control block unit 83 to couple hoses 117, 120 in communication with the pump 82 to receive pressurized hydraulic fluid, and to couple hoses 118, 121 in communication with the reservoir 84. Such coupling of the hoses 117, 118, 120, 121 can be used to drive hydraulic fluid to and from one or more hydraulic motors associated with an accessory tool mounted to the rear of the vehicle 10. On the other hand, if the determination in step S46 is negative, in step S48, the controller 92 generates a control signal to cause the valve block control unit 83 to decouple the hoses 117, 118, 120, 121 from the pump 82 and the reservoir 84 to cease farther movement of the accessory tool's hydraulic motor(s). After the performance of either of steps S47 or S48, in step S49, the controller 92 determines whether the switch 150 has activated its signal under manipulation of the switch 150 by the operator. If so, in step S50, the controller 92 generates a control signal to cause the valve control block unit 83 to couple the hose 111 to the pump 82 to receive pressurized hydraulic fluid. Such coupling of the hose 111 to the pump 82 causes the dump actuator 89 to extend and tilt the dump body 8 to dump any load therein. On the other hand, if the determination in step S49 is negative, in step S51, the controller 92 generates a control signal to cause the valve control block unit 83 to couple the hose 111 to the reservoir 84 to expel hydraulic fluid from the dump actuator 89 and permit the dump body 8 to lower into contact with the chassis 2. After the performance of either step S50 or S51, in step S52, processing performed by the controller 92 under control of its control program ends in step S52.

4. Dump Body and Related Elements of the Vehicle

Figure 8A:
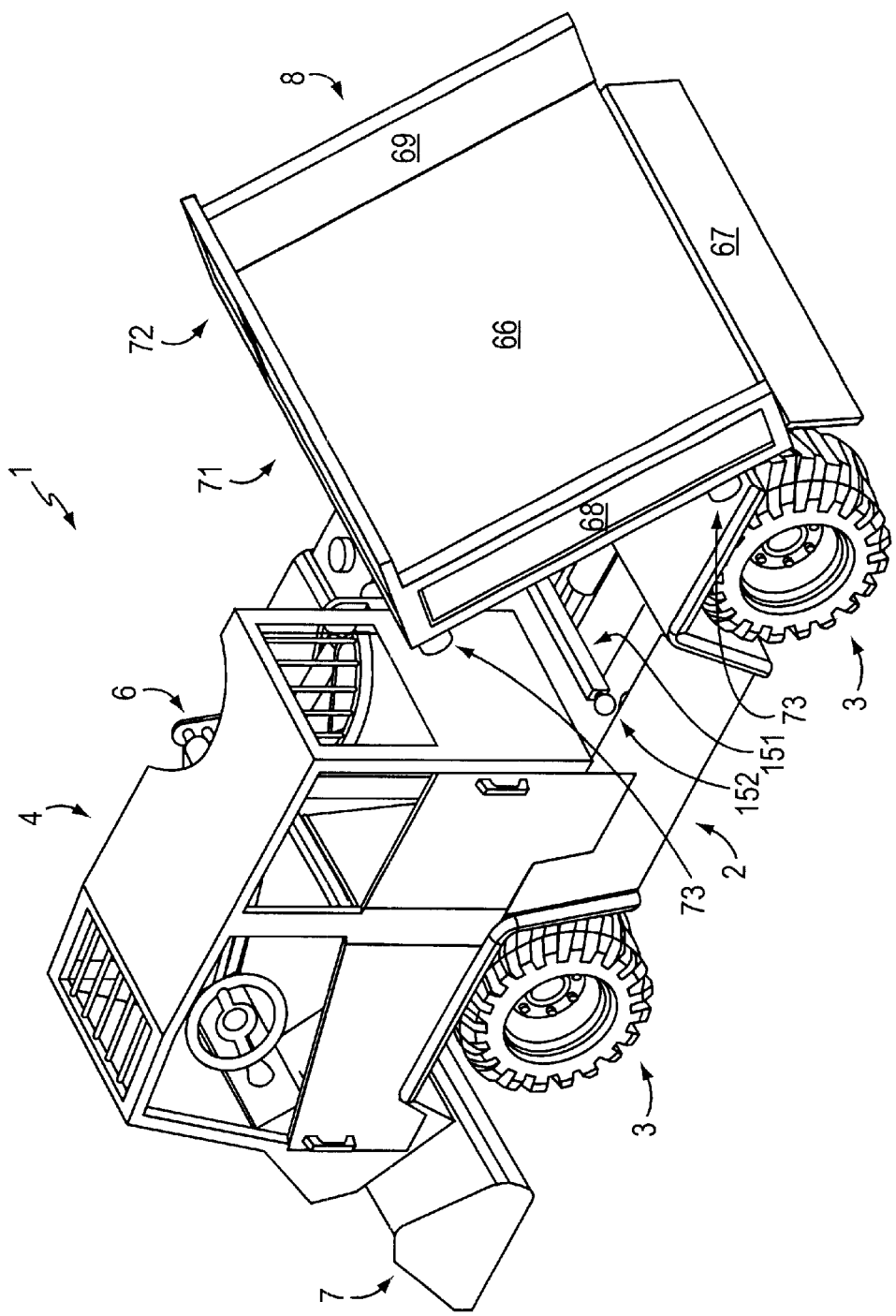
Figure 8B:
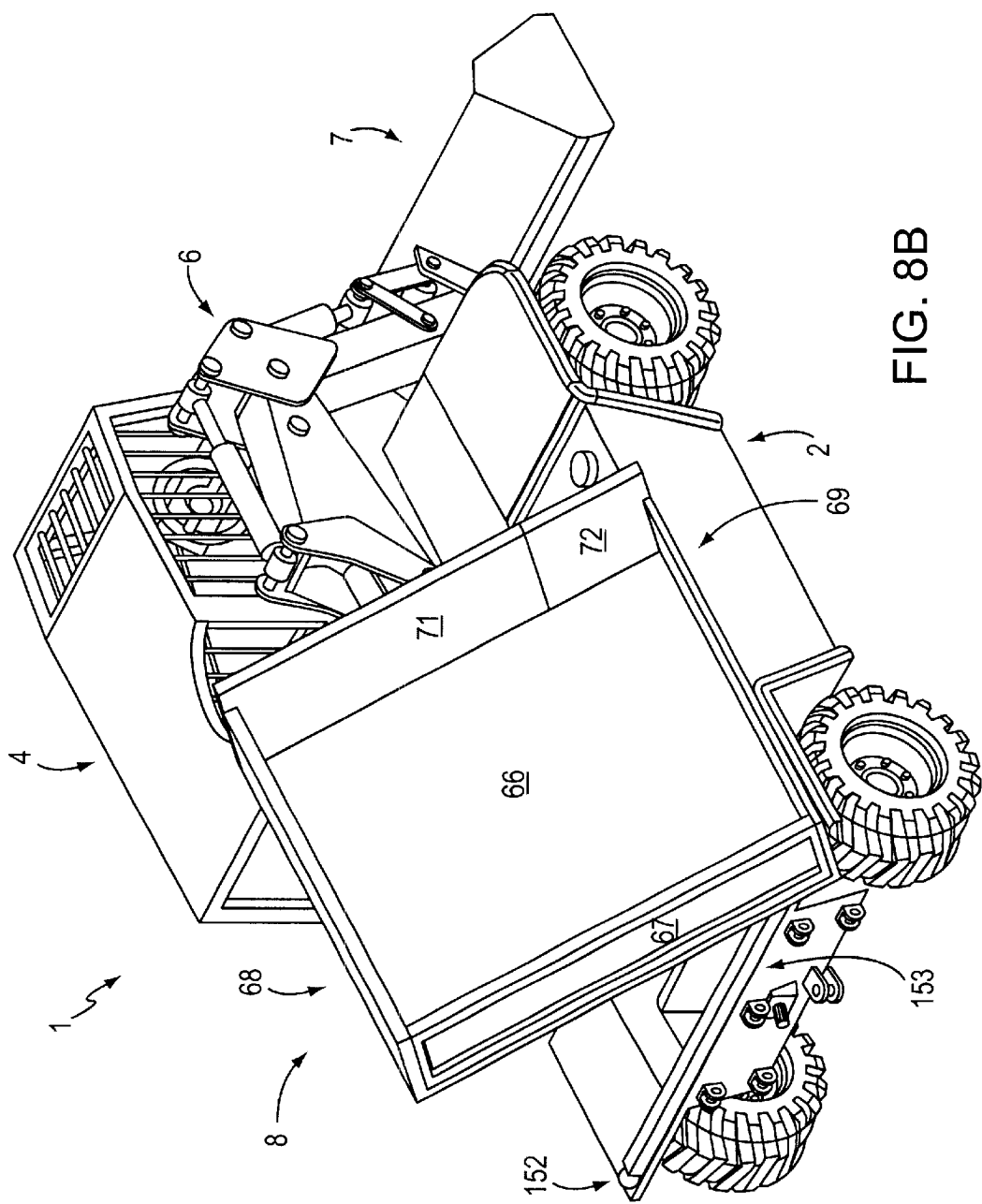
Figure 8D:
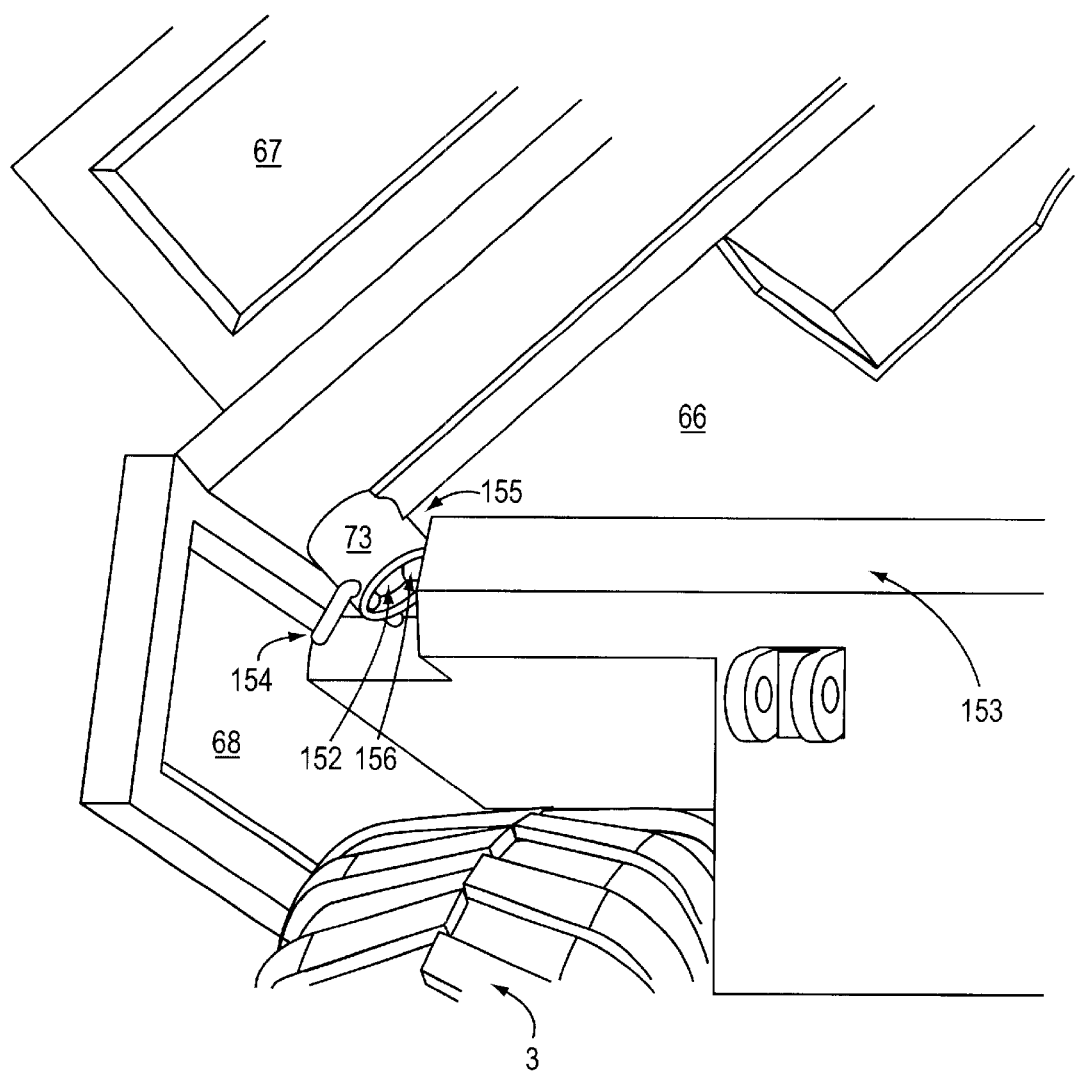

FIGS. 8A–8D are views of the dump body 8 in various tilting positions, and the elements of the vehicle 1 which make it possible to tilt the dump body in various directions. As seen in FIG. 8A, the vehicle 1 includes a crossbar 151 extending across and mounted to the chassis 2. To the opposite ends of the crossbar 151 are mounted balls 152 which can be engaged with and selectively secured to respective sockets 73. As shown in FIGS. 8B–8D, the vehicle 1 includes a crossbar 153 extending across and mounted to a rear portion of the chassis 2. The opposite ends of the crossbar 153 have balls 152 mounted thereto for receiving and selectively securing the balls 73 in respective sockets 73 mounted on at the corners of the underside of the dump body 8. Referring now to FIG. 8D, the vehicle 1 includes four angled pins 154 which can be inserted through respective sockets 73. The angled pins 154 can be locked into engagement with respective balls 152 by insertion of such angled pins 154 through bores defined in respective sockets 73. The pins 154 are inserted into the sockets 73 associated with a pair of balls 152 that are positioned on the rear or either side of the vehicle 1, and are omitted from the opposite pair of balls 73. The sockets 73 also define slots 155 on respective sides thereof that are closest to the ends of the crossbars 151, 153 to provide clearance for the necks 156 extending between the ends of the crossbars and the balls 152 coupled thereto. More specifically, in FIG. 8A, the pins 154 for the sockets 73 at the rear of the vehicle 1 are inserted through respective sockets to hold the balls 152 at either end of the crossbar 153 in such sockets. In FIG. 8A, the pins 154 are extracted from the frontmost sockets 73 so that the dump body 8 can be freely lifted away from the balls 152 attached to the ends of the front crossbar 151 to permit the dump body to be tilted rearwardly if the dump body actuator 89 is extended between the chassis 2 and the dump body 8. In FIG. 8B, the pins 154 on the right side of the vehicle 1 are inserted into the sockets 73 to hold respective balls 152 at the rightmost ends of the crossbars 151, 153 therein, and the pins 154 on the leftmost portion of the vehicle 1 are removed to permit the leftmost portion of the dump body 8 to be lifted if the dump actuator 89 is extended between the chassis and the dump body. In FIG. 8C, the pins 154 are inserted through respective sockets on the leftmost side of the dump body 8 to secure the balls 152 at the left ends of the crossbars 151, 153, and the pins 154 are removed from the rightmost sockets to permit them to be lifted away from the dump body 8 if the hydraulic actuator 89 is extended. Accordingly, as illustrated in FIGS. 8A–8C, by selectively inserting and removing the pins 154 from respective sockets 73, the dump body 8 can be tilted relative to the chassis by extending the dump actuator 89 via activation of switch 150 to dump any load contained in the dump body to the rear of the vehicle 1 (FIG. 8A), on the right side of the vehicle (FIG. 8B), or on the left side of the vehicle (FIG. 8C). The dump body 8 can of course be locked to the chassis 2 to prevent it from being tilted by inserting pins 154 into all four of the sockets 73 if it is desired not to risk accidental tilting of the dump body, for example, if driving the vehicle to a site to dump the load contained in the dump body.

5. Steering Unit of the Vehicle

In FIG. 9, the steering unit 26 of the vehicle 1 is shown. More specifically, the steering unit includes a hydraulic pump 160, reservoir 161, steering fluid control unit 162, steering column 163, steering actuator 164, a tie rod 165, hoses 166–170, and hydraulic fluid 171. Such elements are commercially available from numerous commercial sources including Brueninghaus Hydromatik GmbH. The above elements are mounted in or to the chassis 2. The hydraulic pump 160 is coupled to receive motive power from the power plant 80 via the pumps 81, 82. The pump 160 is coupled in communication with the reservoir 161 via the hose 166 to receive hydraulic fluid 171 stored therein. The pump 160 receives and pressurizes the hydraulic fluid 171 and supplies such fluid to steering fluid control unit 162 via the hose 167. The steering wheel 27 is coupled to the steering fluid control unit 162 via the column 163. Based on the angular position of the steering wheel 27 as controlled by the operator, the steering fluid control unit 162 controls the flow of hydraulic fluid into and out of the hydraulic actuator 164 via the hoses 168, 169. More specifically, if the steering unit is turned to the right (i.e., clockwise) relative to the perspective of the seated operator, the steering fluid control unit 162 couples the hose 167 in communication with the hose 168, forcing the hydraulic actuator 164 to retract. Because the cylinder end of the actuator 164 is mounted to the axle 134, from the operator's perspective, leftist swivel part 137 and the hydraulic motor 138 turn in a direction permitting the vehicle to be turned to the right. Hydraulic fluid 171 displaced by retraction of the hydraulic actuator 164 moves in a direction through the hose 169 to the steering fluid control unit 162 and further through the hose 170 to the reservoir 161. On the other hand, if the operator turns the steering wheel 27 to the left (i.e. counterclockwise) from the operator's seated perspective, the steering fluid control unit 162 couples the hose 167 in communication with the hose 169 to extend the hydraulic cylinder 164, causing the leftist swivel part 137 and hydraulic motor 138 to turn the front wheels 3 so that the vehicle 1 can be turned to the left. Hydraulic fluid displaced from the hydraulic actuator 164 travels through the hose 168 to and through the steering fluid control unit 162 to the reservoir 171 via the hose 170.

6. Wheel Drive Unit of the Vehicle

Figure 10:
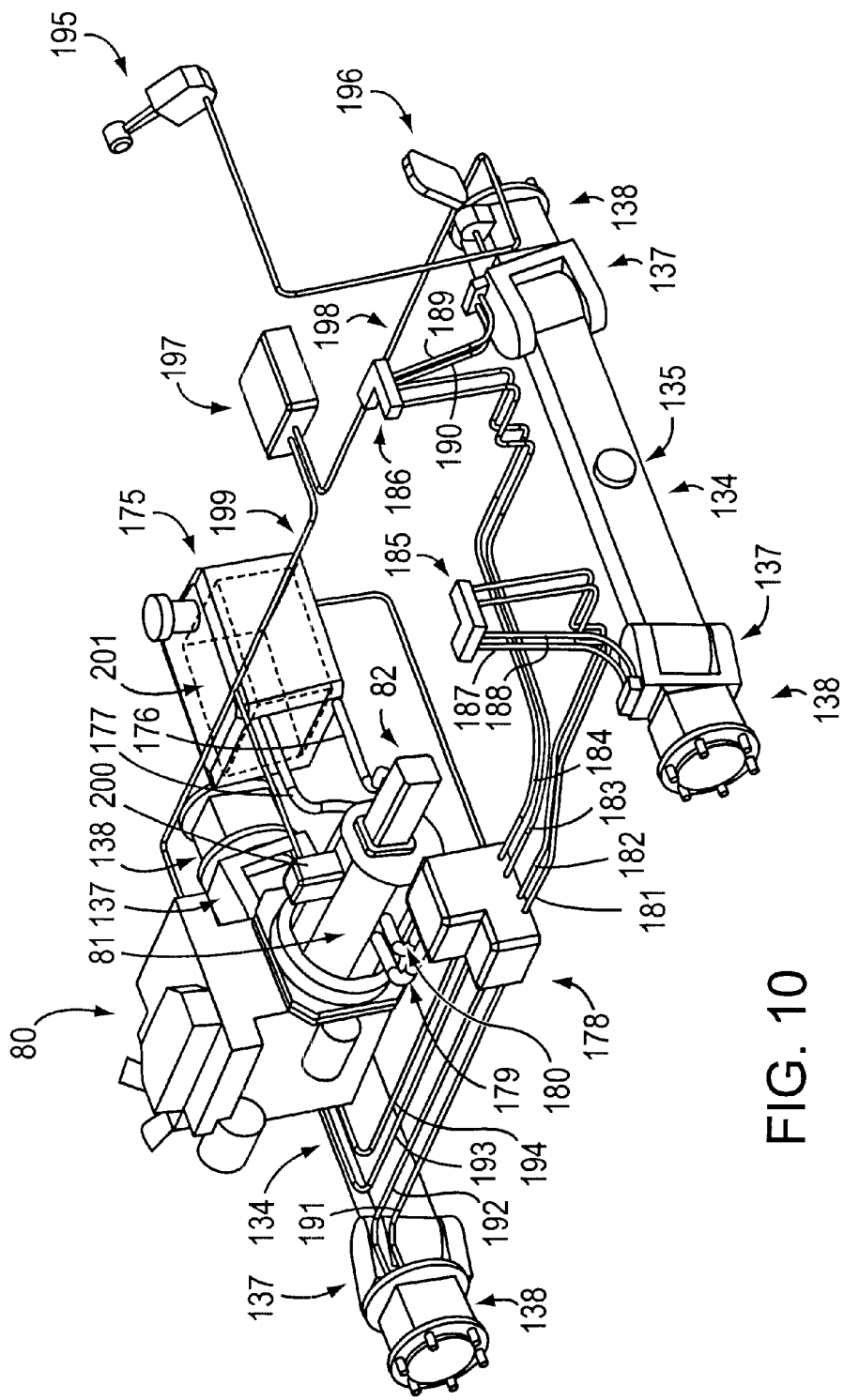
FIG. 10 is a view of the drive unit of the invented vehicle.

The wheel drive unit of the vehicle 1 is shown in FIG. 10, and includes the regulating pump 81, the reservoir 175, pipes 176, 177, fluid pressure regulator 178, pipes 179, 180, hoses 181–184, couplers 185, 186, hoses 187–194, direction control element 195, throttle 196, controller 197, electrically-conductive lines 198, 199, regulator 200, and hydraulic fluid 201. The elements are commercially-available from numerous sources including Brueninghaus Hydromatik GmbH. The above-listed elements are mounted in and supported by the chassis 2. The pump 81 is coupled in communication with the reservoir 175 via the pipe 176.

The pump 81 receives and pressurizes hydraulic fluid 201 from the reservoir 175 via the pipe 176. The pump 81 is coupled in communication with the fluid pressure regulator 178 to supply pressurized hydraulic fluid thereto. The fluid pressure regulator 178 is coupled in communication with the motors 138 for respective wheels 3 via the hoses 181–184, couplers 185, 186, and hoses 187–194. The fluid pressure regulator 178 controls flow pressures of the pressurized hydraulic fluid to and from the motors 138 via the hoses 181–184, couplers 185, 186, and hoses 187–194. Hydraulic fluid returning from the hydraulic motors 138 is received by the fluid pressure regulator 178 which is coupled in communication with the pump 81 via the pipe 180 to supply such hydraulic fluid to the pump 81. The pump 81 is coupled in communication with the reservoir 175 to supply the return flow of hydraulic fluid to the reservoir 175.

The controller 197 is coupled to receive a signal indicative of the amount of power to be applied to drive the wheels 3, which signal is generated by foot pressure applied to the pedal throttle 196. Based on such signal, the controller 197 generates a power signal supplied to the power plant to set the amount of motive power delivered from the power plant to the pumps 81, 82, 160. Also, based on the throttle signal, the controller 197 generates a pump flow signal and is coupled supply such signal to the regulator 200 which is coupled to control the rates of flows of hydraulic fluid into and out of the pump 81 via the pipes 179, 180, respectively. The direction control element 195 can be manipulated by the operator to generate a direction signal indicative of whether the vehicle is to be driven in the forward or reverse direction. The controller 197 is coupled to receive the direction signal, and generates a direction control signal based thereon. The controller is coupled to supply the direction control signal to the regulator 200 via respective line 199. Based on the direction control signal, the regulator 200 sets the flow direction of hydraulic fluid 201 through the pump 81 and pipes 179, 180 to drive the motors 138 and mounted wheels 3 in either the forward or reverse directions as indicated by the control signal. Further, based on the throttle signal, the controller 197 generates a regulator signal supplied to the fluid pressure regulator 178 to set the flow rates and pressures of hydraulic fluid flowing through the fluid pressure regulator 178. The levels of the power signal, pump flow signal, and regulator signal are related to respective levels of the throttle signal. Therefore, setting the throttle signal to a particular level causes the controller 197 to set the power signal, pump flow signal, and regulator signal to levels corresponding to the throttle signal's level.

Figure 11:
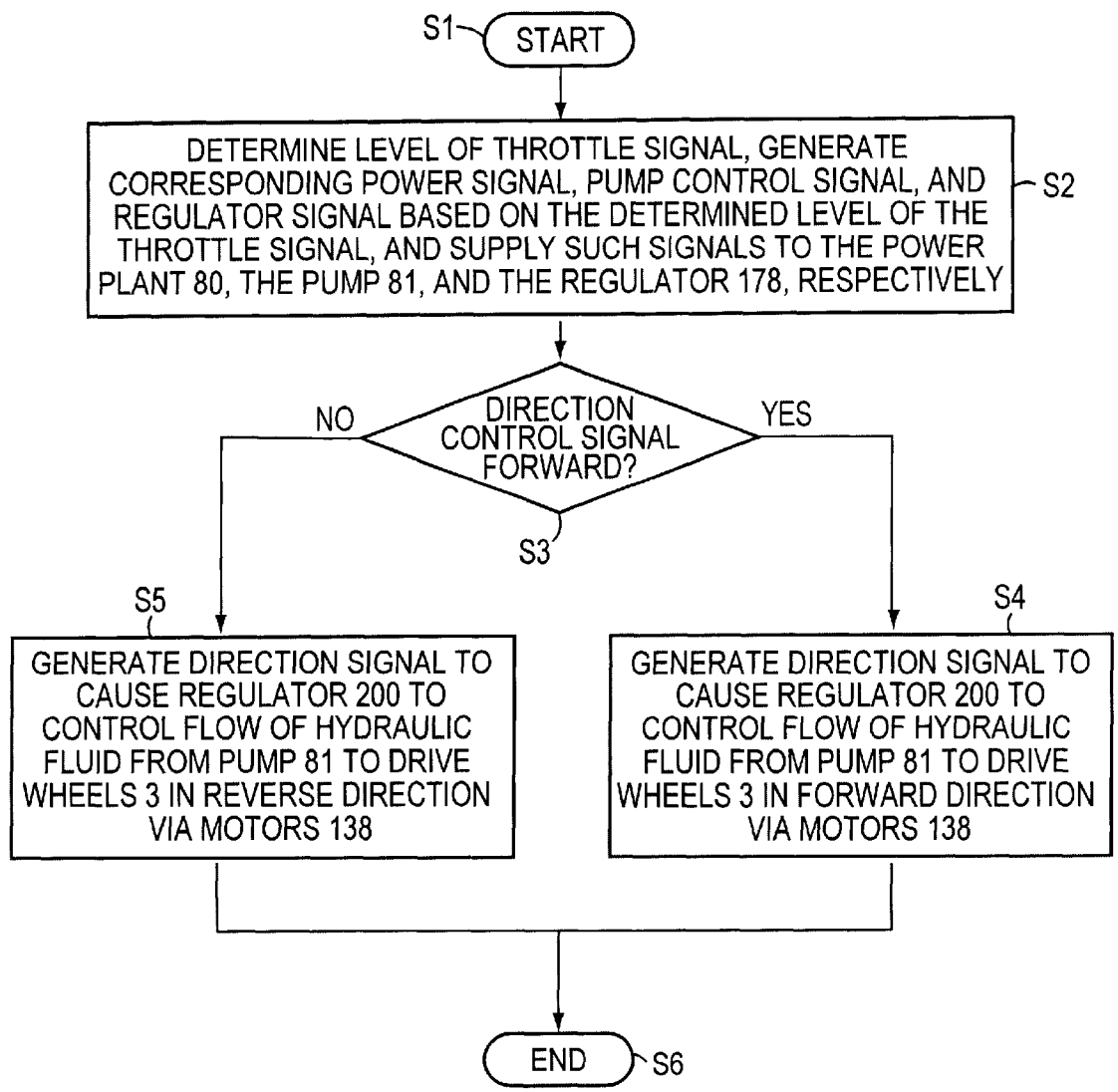
FIG. 11 is a flowchart of processing performed by the controller of the vehicle's drive unit.

In FIG. 11, processing performed by the controller 197 under its control program, is shown. The controller 197 can be the same or similar type of unit as the controller 92. In step SI of FIG. 11, processing performed by the controller 197 under its control program begins. In step S2, the controller 197 receives and determines the level of the throttle signal and generates corresponding levels for the power signal, pump control signal, and regulator signal based on the throttle signal level. The controller 197 supplies levels of the power signal, the pump control signal and the regulator signal to the power plant 80, the pump 81, and the regulator 179, respectively, to drive such elements. In step S3, the controller 197 receives and determines the level of the direction control signal to determine whether such signal has been set by the operator to indicate that the wheels 3 should be driven in the forward direction. If so, in step S4, the controller 197 generates the direction signal to cause the regulator 200 to control the flow of hydraulic fluid from the pump 81 in such a manner as to drive the wheels 3 to move the vehicle 1 in the forward direction. On the other hand, if the determination of step S3 is negative, in step S5, the controller 197 generates the direction signal to cause the regulator 200 to control the flow of hydraulic fluid from the pump 81 to drive the wheels 3 to move the vehicle 1 in the reverse direction via the motors 138. After performance of either steps S4 or S5, processing performed by the controller 197 ends in step S6 of FIG. 11.

7. Electrical Unit of the Vehicle

Although the vehicle's electrical unit has not been described herein in detail, such unit can be conventional, generally including a battery and a starter selectively coupled by activation of switch 139. Upon activating the switch 139, the starter is driven by the battery to engage with and turn over the power plant 80 if implemented as a combustion engine. The battery also energizes hot plugs or is coupled via electrical cables to a distributor that is in turn coupled to spark plugs installed in the engine. The energized hot plugs or spark plugs can be used to ignite fuel in the engine's cylinders. Such electrical unit can also include an alternator electrically-coupled to the battery and mechanically-coupled to the power plant, to recharge such battery during operation of the vehicle. In addition, the vehicle 1 can include head, tail, and side lights, turn indicators, windshield wipers and washers, etc. and related circuitry coupled to the vehicle's battery. The vehicle's battery and/or alternator also supply electric power to the controllers 92, 197.

8. Various Uses of the Vehicle

Figure 12:
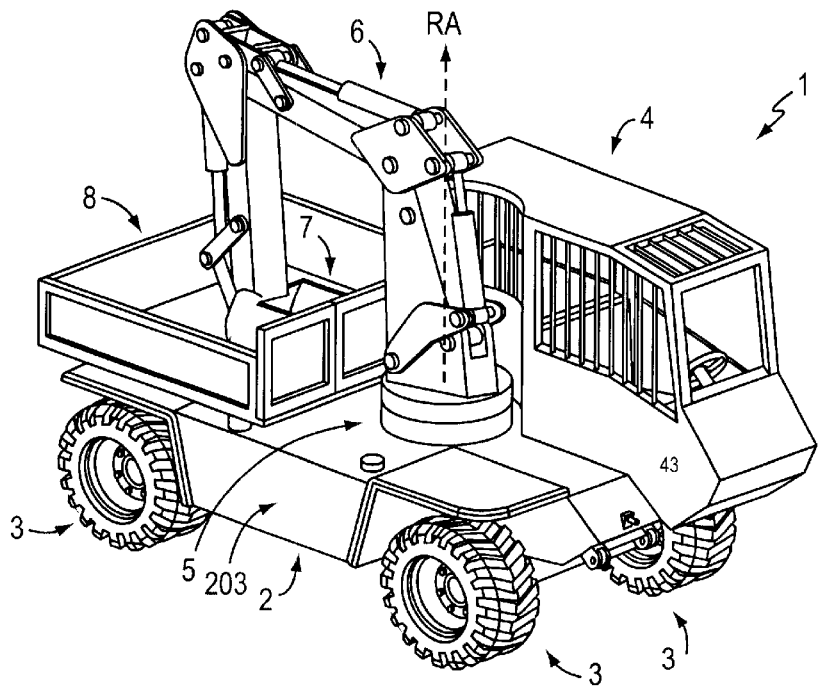
FIG. 12 is a view of the vehicle with the tool stored in the dump body for vehicle transportation.

Referring to FIG. 12, the boom unit 6 and the attached tool 7 can be swept over the side of the vehicle opposite the cabin 4 (i.e., the left side of the vehicle in FIG. 12) through an angular range of approximately 210° about the axis RA by rotation of the turntable unit 5 via control stick 93. For example, this permits the boom unit and attached tool to be moved from a position forward of the vehicle chassis 2 to a position behind the vehicle chassis in proximity to the dump body 8. For example, a load can be picked up in front of or at the side of the vehicle 1 by the turntable unit 5, boom unit 6, and tool 7 by the operator's manipulation of the control sticks 93, 94 and switches 144–150. Such load can be transferred to and dropped in the dump body 8 by operation of the control sticks 93, 94 and the switches 144–150. As shown in FIG. 12, the tool 7, in this case a dipper bucket, can be rested in the dump body 8 for storage during transportation of the vehicle. Because the vehicle 1 requires no space at its side for storage of the tool 7 during transport, the vehicle can include a relatively large fuel tank 203 at the side thereof. Such fuel tank 203 is coupled in communication with the power plant 80. Because the fuel tank 203 can hold a relatively large amount of diesel or gasoline fuel, for example, the time duration over which the vehicle can be operated can be greatly enhanced relative to other types of work vehicles.

Figure 13:
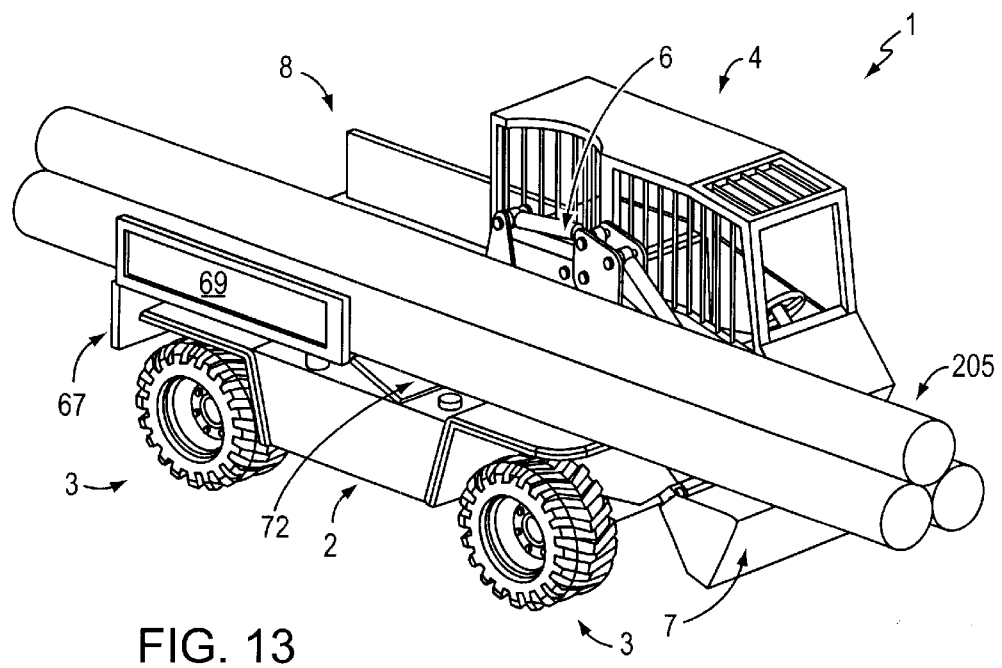
FIG. 13 is a view of the vehicle carrying elongated load objects.

FIG. 13 shows the capability of the vehicle 1 to carry elongated objects 205 such as logs, poles, bars, columns, or the like. In FIG. 13, a loader bucket tool 7 is attached to the boom unit 6, and is positioned forwardly of the vehicle chassis 2 and is raised above the ground to support the front ends of the objects 205. The tailgate 67 and folding portion 72 are folded downwardly to provide clearance for the rear or middle portions of the objects 205. The load objects 205 can be laid to rest on the floor portion 66 of the dump body 8 and restrained from moving by the presence of the side face 69 on one side, and the cabin 4 and boom unit 6 on the opposite side. The objects 205 can further be supported by the upper surface of the chassis 2 on the side thereof opposite the cabin 4. The objects 205 can be loaded in the vehicle 1 by a conventional loader, for example. The objects 205 can be transported by the operator's manipulation of the wheel 27, direction control 195, and pedal throttle 196 to drive the vehicle to a location at which the objects are to be unloaded. The operator can manipulate the control sticks 93, 94 and the switches 145–150 to raise the front ends of the objects via the boom unit 6 and the tool 7 so that the load objects slide out the rear of the dump body 8. If necessary, the turntable unit 5 can be rotated in a clockwise direction from a top plan perspective looking downward at the upper surface of the chassis 2, to move the front ends of the objects over the side of the vehicle's chassis. The tool 7 can then be lowered by the control sticks 94 and switch 144, to unload the objects 205.

Figure 14:
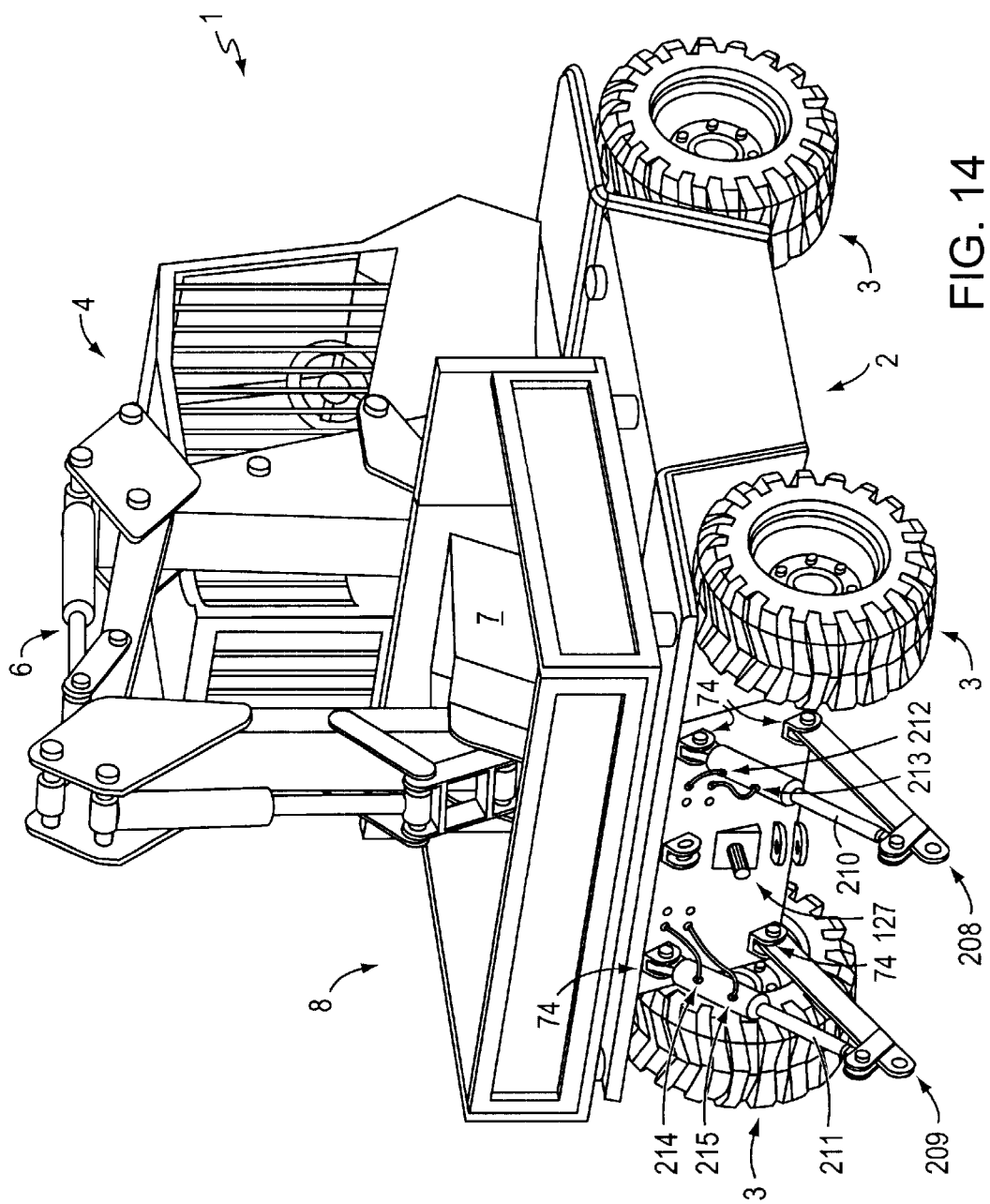
FIG. 14 is a view of elements used to attach a rear-mounted accessory tool to the rear end of the vehicle.

Referring to FIG. 14, the vehicle can include elements for attaching an accessory tool to the rear of the vehicle 1. As shown in FIG. 14, such elements include bars 208, 209, hydraulic actuators 210, 211, and hoses 212–215 provided for respective actuators. The ends of the bars 208, 209 are attached to respective brackets 74 on the lower right and left of the rear of the chassis 2 via bolts or the like. The bars 208, 209 are free to pivot about such bolts. The actuators 210, 211 are pivotally coupled at respective first ends to the rear of the vehicle chassis via brackets 74 and bolts inserted there through. The respective second, opposite ends of the actuators 210, 211 are coupled to respective ends of bars 208, 209 opposite those coupled to the respective brackets 74. The hoses 212, 213 are coupled in communication with couplers 130 to the hoses 114, 115 inside of the chassis 2 (see FIGS. 3 and 4). The hoses 214, 215 are coupled in communication with the couplers 130 to the hoses 122, 123 positioned inside of the chassis. By manipulation of appropriate switches 146–148, the operator can raise and lower bars 208, 209. The bars 208, 209 define respective eyes to facilitate attachment of such bars to an accessory tool.

Figure 15:
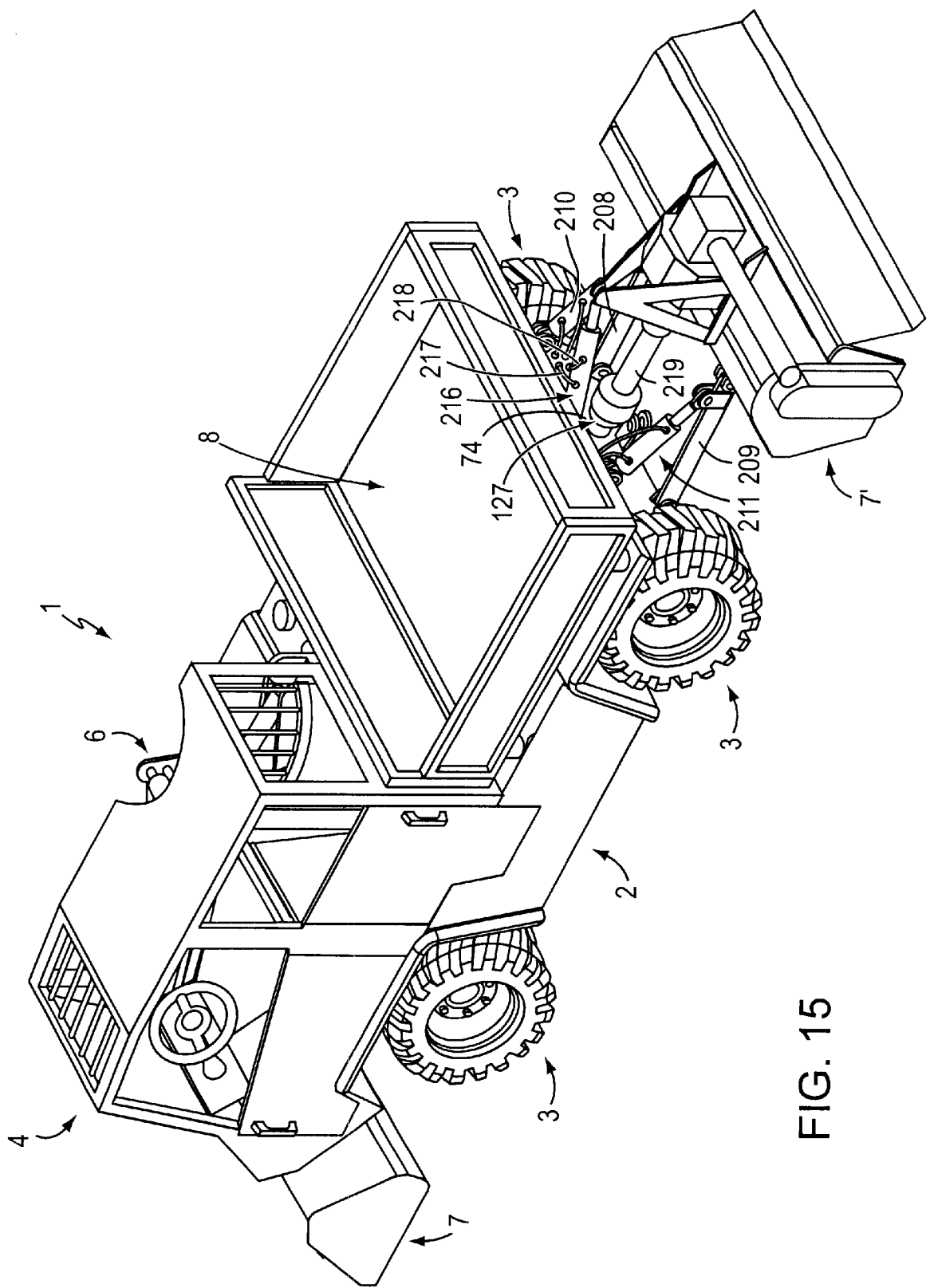
FIG. 15 is a view of the vehicle with a mower accessory tool attached to the rear end thereof.

Referring to FIG. 15, the vehicle 1 includes an accessory tool 7' (in this case a mower) attached to the rear of the vehicle chassis 2. More specifically, the tool 7' is coupled to the ends of the bars 208, 209 via respective bolts. For additional lifting power, the vehicle 1 includes a hydraulic actuator 216 attached to a bracket 74 positioned on the upper center of the chassis's rear. The actuator 216 has one end coupled to the center bracket 74, and an opposite end coupled to the tool 7'. The actuator 216 is coupled in communication with hoses 116, 117 inside of the chassis 2 (see FIGS. 3 and 4) via respective hoses 217, 218 of the vehicle 1. The vehicle 1 also includes a shaft 219 coupled at one end to the PTO 127, and at its opposite end to the mower's blade. The shaft 219 transmits torque from the PTO 127 to the accessory tool 7 if the operator activates the switch 145. The mower tool 7 is raised or lowered by activation of switches 146–148, the lowered position used to bring the blades of the mower sufficiently low with respect to the ground to cut vegetation to a desired height, and the raised position being used if not mowing. To mow, the driver activates switches 145–148 to drive and lower the mower tool 7 and uses wheel 27, direction control 195, and pedal throttle 196 to drive the vehicle over the area of vegetation to be mowed. After mowing, the driver can manipulate the switches 145–148 to stop driving and to raise the mower tool 7 above the ground.

Figure 16:
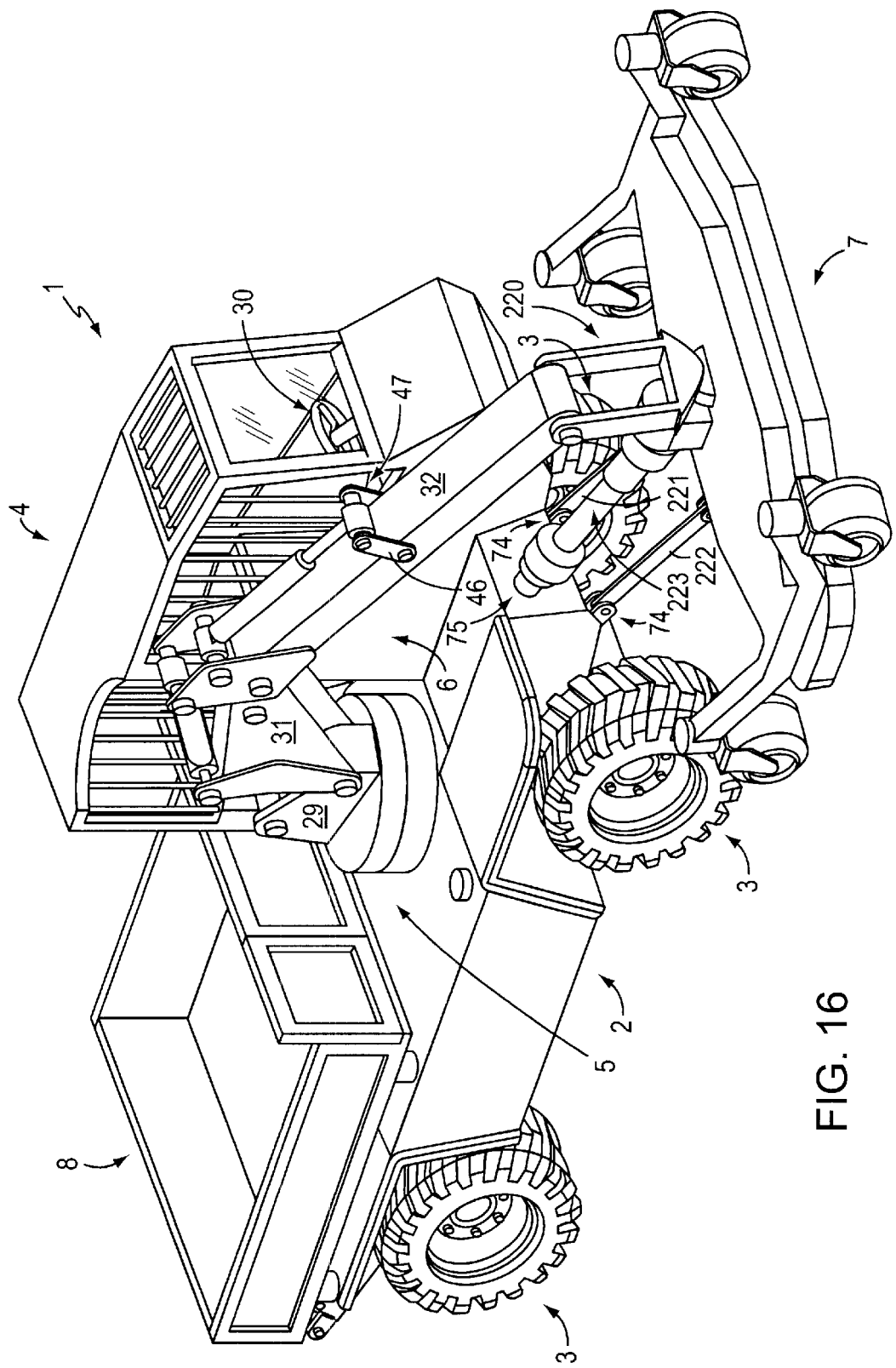
FIG. 16 is a perspective view of the vehicle with boom unit coupled to a front-mounted mower.

Referring to FIG. 16, the vehicle 1 includes a front-attached mower tool 7 and coupler 220, bars 221, 222, and shaft 223. The bars 221, 222 are coupled at respective first ends to brackets 74. The bars 221, 222 are also coupled at respective second opposite ends to the mower tool 7. The shaft 223 has a first end coupled to the PTO 75, and a second opposite end coupled to drive the blades of the mower tool 7. To mow, the driver activates switch 145 to supply motive force to drive the mower tool 7 and manipulates the control stick 94 and switch 144 to lower the mower tool 7 to the ground. The operator uses the wheel 27, direction control 195, and pedal throttle 196 to drive the vehicle over the area of vegetation to be mowed. To stop mowing, the operator can manipulate switch 145 to cease movement of the blades of the mower tool 7, and can manipulate the control stick 94 and the switch 144 to raise the mower tool above the ground.

Figure 17:
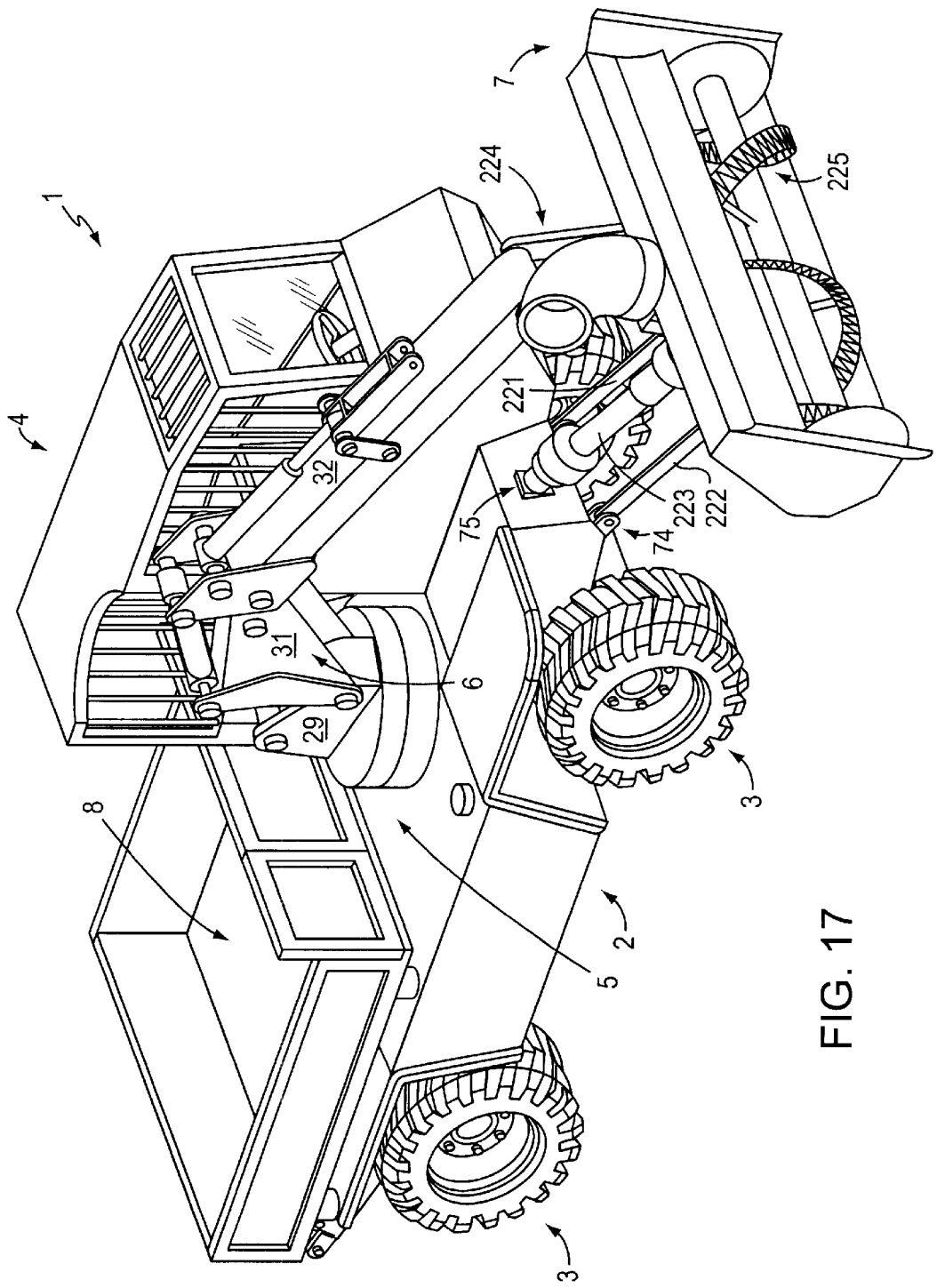
FIG. 17 is a perspective view of the vehicle with boom unit coupled to a thresher tool.

Referring to FIG. 17, the vehicle 1 includes a front-attached thresher tool 7 with coupler 224 mounting attached to a central portion of such tool. The bars 221, 222 are coupled between the brackets 74 at the front end of the chassis and the tool 7 via respective bolts. The shaft 223 is coupled between the PTO 75 and the tool 7 to drive the thresher's blade 225 to rotate. The operator manipulates control stick 94 and switch 144 to lower the mower tool 7 to the ground. The operator controls the tool by activating switch 145 to cause the thresher's blade 225 to turn. The operator uses the wheel 27, direction control 195, and pedal throttle 196 to drive the vehicle over the area of vegetation to be threshed. The thresher tool 7 can then be stopped by manipulation of switch 145, and the tool 7 can be raised above the ground by manipulating the control stick 94 and the switch 145 to raise the thresher tool above the ground.

Figure 18:
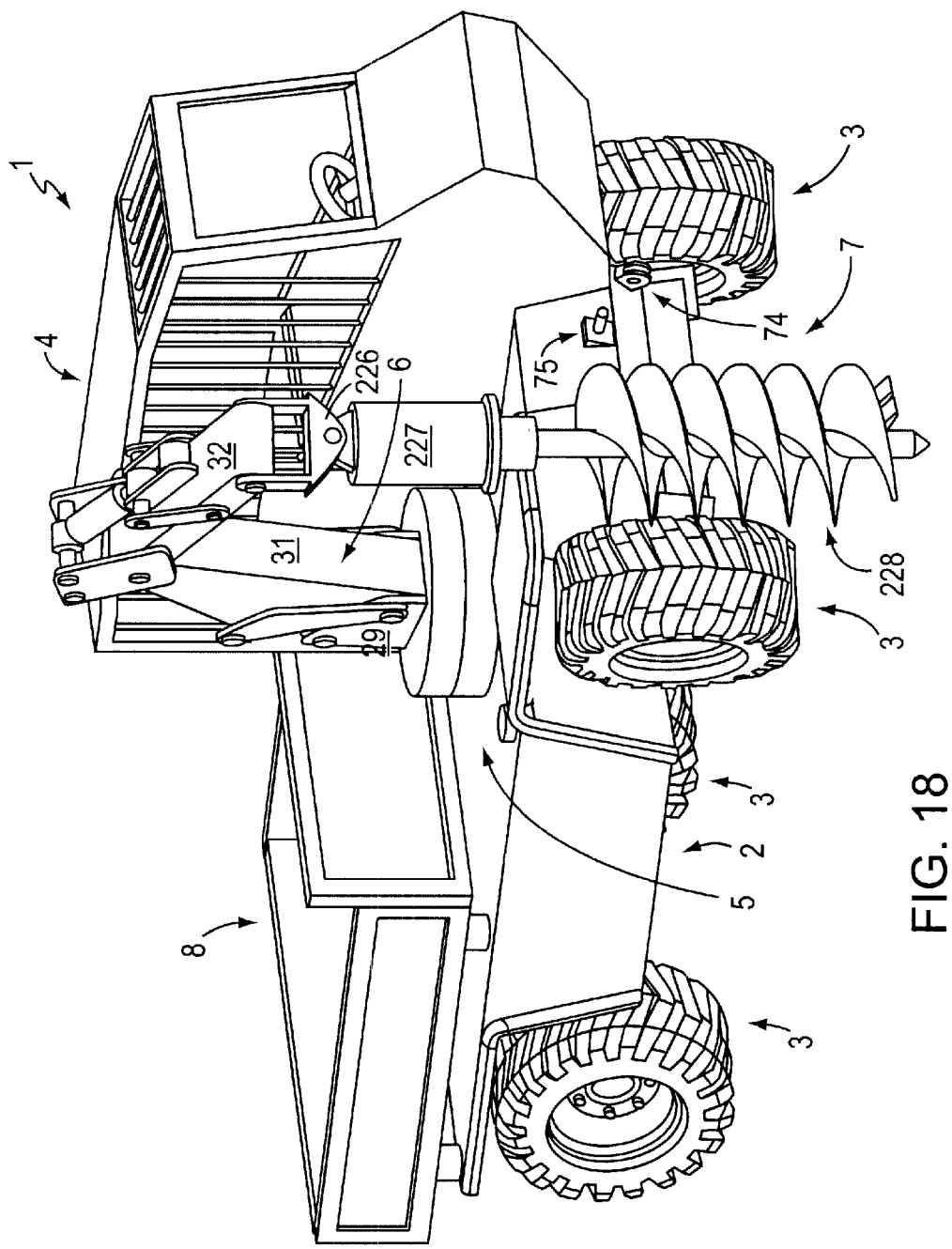
FIG. 18 is a perspective view of the vehicle with boom unit coupled to an auger tool.

Referring to FIG. 18, the vehicle 1 includes an auger tool 7 with a coupler 226, motor 227, and drill 228. The coupler 226 is attached to the end of the boom unit's arm 32. The coupler 226 is in turn coupled to a motor 227. The motor 227 is in turn coupled to the drill 228. The motor 227 can include a combustion engine that drives the drill 228 to rotate and drill into the ground to form a hole for receiving the end of a pole or post, for example. Alternatively, the motor 227 can be hydraulically-driven by hoses (not shown) coupled in communication between such motor and respective couplers 129 (not shown in FIG. 18, but shown in FIG. 4). The operator uses the auger tool by manipulating control sticks 93, 94 and switch 144 to position the auger tool via turntable unit 5 and boom unit 6 at a location at which a hole is to be formed in the ground. The motor 227 of the auger tool 7 is then activated to rotate drill 228 to bore the hole into the ground. If driven by an independent motor 227, such motor is started and activated to drill into the ground as the operator lowers the boom unit 6 via control stick 94 and/or switch 144. If hydraulically-driven, the auger tool 7 is driven by moving control stick 93 forward to drive the motor 227 to turn the drill 228 in a forward direction into the ground. The control stick 93 can be moved backward to drive the auger tool 7 in the reverse direction to assist in extraction of the drill 228 from the ground while operating control stick 94 and/or switch 144 to raise the auger tool.

9. Alternative Configurations of the Vehicle

The vehicle 1 can include duplicate control sticks 93, 94 and switches 144–150 stationed in the co-operator's portion of the cabin so that the co-operator can independently operate the turntable unit 5, the boom unit 6, the tool 7, the dump body 8, and any accessory tool. Such arrangement is particularly beneficial if moving the turntable unit 5 so that the boom unit 6 and tool 7 are positioned over the rear portion of the vehicle where the boom unit and tool may not be visible to the operator.

The particular assignment of the control sticks 93, 94 and the switches 144–150 to the elements controlled thereby can be done differently than described herein. In other words, the control sticks 93, 94 and switches 144–150 could be programmed to control different actuators or flows to couplers as compared to the specific embodiment set forth herein. In addition, such control sticks 93, 94 and switches 144–150 can be used to control types of motions rather than specific actuators. For example, the forwardibackward or left/right movement of the control sticks 93 or 94 could be used to control movement of the tool in forward, backward, upward or downward directions, each of such movements requiring simultaneous movement of more than one actuator to move the tool in such directions. In addition, other types of control sticks such as sliders, dials, turn wheels, balls, or other forms of control sticks could be used in the invented vehicle. All such elements or equivalents thereof can be used within the vehicle's control unit.

The many features and advantages of the present invention are apparent from the detailed specification and thus, it is intended by the appended claims to cover all such features and advantages of the described apparatus and methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

What is claimed is:

1. A vehicle for operation with a load, the vehicle comprising:
    a chassis having a longitudinal axis symmetrically dividing the chassis through its middle;
    a cabin fixedly mounted on a first side of the longitudinal axis of the chassis on a forward portion thereof;
    a plurality of wheels coupled to the chassis, including front and rear wheels, to movably support the chassis;
    a boom unit;
    a tool coupled to an end of the boom unit;
    a turntable unit fixedly mounted to the chassis at a central portion thereof on the longitudinal axis, the turntable unit separate from said cabin and spaced along the longitudinal axis from said front and rear wheels, the turntable unit coupled to and supporting the boom unit for rotation; and
    a dump body-mounted to a rear portion of the chassis, the dump body having a floor portion and faces for containing the load,
    the turntable capable of moving the boom unit and tool with the load over a second side of the chassis opposite the first side between a first position at which the tool and load are positioned forward of the chassis and a second position at which the tool and load are positioned over the dump body.

2. A vehicle as claimed in claim 1, wherein the tool is a load bucket.

3. A vehicle as claimed in claim 1, wherein the tool is a dipper bucket.

4. A vehicle as claimed in claim 1, wherein the tool is an auger unit.

5. A vehicle as claimed in claim 1, further comprising:
    at least one hanger member mounted to the chassis; and
    an accessory tool coupled to the hanger member.

6. A vehicle as claimed in claim 5, wherein the accessory tool includes a mower.

7. A vehicle as claimed in claim 1, wherein the cabin includes a first seat for an operator of the vehicle and a second seat mounted reversely relative to the first seat for a co-operator of the vehicle.

8. A vehicle as claimed in claim 1, wherein the floor portion of the dump body is surrounded by the faces which comprise front, rear, and side faces, the front and rear faces foldable to respective lowered positions to provide clearance for at least one elongated load object resting across the floor portion of the dump body.

9. A vehicle as claimed in claim 1, wherein the dump body can be tilted to discharge the load from the dump body.

10. A vehicle as claimed in claim 1, further comprising:
    at least one hanger coupled to the chassis and the tool.

11. A vehicle as claimed in claim 1, wherein the dump body can be selectively tilted in one of three directions to dump the load from the body.

12. A vehicle as claimed in claim 1, wherein the vehicle further comprises:
    a plurality of sockets mounted to the dump body;
    at least two crossbars mounted to the chassis;
    a plurality of balls mounted to respective ends of the two crossbars;
    a plurality of pins insertable into respective sockets to lock respective balls therein to define a tilt direction of the dump body; and
    a dump body actuator mounted to the chassis and coupled to the dump body, for tilting the dump body relative to the chassis.

13. A vehicle as claimed in claim 1, wherein the cabin has a concave portion opposing the turntable unit, the concave portion providing clearance to permit the turntable unit to rotate.

14. A vehicle for operation with a load and controlled by an operator, the vehicle comprising:
    a chassis having a longitudinal axis symmetrically dividing the chassis through its middle;
    a cabin fixedly mounted on a first side of the longitudinal axis of the chassis on a forward portion thereof, the operator positioned in the cabin if operating the vehicle;
    a plurality of wheels coupled to the chassis, including front and real wheels, to movably support the chassis;
    a boom unit;
    a tool coupled to an end of the boom unit;
    a turntable unit fixedly mounted to the chassis on the longitudinal axis adjacent and separate from the cabin and spaced along the longitudinal axis from said front and rear wheels, the turntable unit coupled to and supporting the boom unit for rotation;
    a dump body mounted to a rear portion of the chassis, the dump body having a floor portion and faces for containing the load;
    a power plant mounted in the chassis; and
    at least one control unit coupled to supply motive power generated by the power plant to at least the turntable unit based on the operator's control action, the turntable unit rotating the boom unit to move over a second side of the chassis opposite the first side under control of the control unit so that the boom unit and coupled tool with the load can be moved between a first position in which the tool and the load are positioned forward of the chassis and a second position in which the tool and the load are positioned over the dump body.

15. A vehicle as claimed in claim 14, wherein the tool is a loader bucket controlled by the control unit to lift, move and dump the load into the dump body via the turntable unit and the boom unit.

16. A vehicle as claimed in claim 14, wherein the tool is a dipper bucket controlled by the control unit to lift, move and dump the load into the dump body via the turntable unit and the boom unit.

17. A vehicle as claimed in claim 14, wherein the tool includes an auger unit.

18. A vehicle as claimed in claim 14, further comprising:
at least one hanger member mounted to the chassis; and
an accessory tool coupled to the hanger member.

19. A vehicle as claimed in claim 18, further comprising:
a shaft extending from the chassis and coupled between the power plant and the accessory tool, for supplying motive force from the power plant to We accessory tool.

20. A vehicle as claimed in claim 19, wherein the power plant generates a pressurized supply of hydraulic fluid, the apparatus further comprising:
at least one hydraulic coupler mounted to the chassis;
at least one actuator coupled between the hanger member and the accessory tool and coupled to the hydraulic coupler;
the control unit selectively supplying pressurized hydraulic fluid to the actuator to raise or lower the accessory tool.

21. A vehicle as claimed in claim 19, wherein the accessory tool is a mower.

22. A vehicle as claimed in claim 14, wherein the cabin includes a first seat for an operator of the vehicle positioned so that the operator can observe an area in front of the vehicle to assist in driving and positioning the tool coupled to the boom unit if moved to the position in front of the chassis, and a second seat for a co-operator positioned behind the first seat and facing toward the rear end of the chassis so that the co-operator can observe the tool coupled to the boom unit if moved to the position overlying the dump body.

23. A vehicle as claimed in claim 14, where the floor portion of the dump body is surrounded by the faces which comprise front, rear, and side faces, the front and rear faces foldable to respective positions level with or lower than the floor portion of the dump body to hold elongated load objects.

24. A vehicle as claimed in claim 14, further comprising:
a dump body actuator coupled between the dump body and the chassis, and
the control unit operable by the operator to extend the dump body actuator to tilt the dump body to dump any load therein.

25. A vehicle as claimed in claim 14, further comprising:
at least one hanger coupled to the chassis and the tool.

26. A vehicle as claimed in claim 14, wherein the dump body can be selectively tilted in one of three directions to dump the load from the body.

27. A vehicle as claimed in claim 14, wherein the vehicle further comprises:
a plurality of sockets mounted to the dump body;
at least two crossbars mounted to the chassis;
a plurality of balls mounted to respective ends of the two crossbars;
a plurality of pins insertable into respective sockets to lock respective balls therein to define a tilt direction of the dump body; and a dump body actuator mounted to the chassis and coupled to the dump body, for tilting the dump body relative to the chassis.

28. A vehicle as claimed in claim 14, wherein the cabin has a concave portion opposing the turntable unit, the concave portion providing clearance to permit the turntable unit to rotate.

29. A vehicle controlled by an operator, the vehicle capable of moving and carrying a load, the vehicle comprising:
a chassis having a longitudinal axis symmetrically dividing the chassis through its middle;
a cabin fixedly mounted on a first side of the longitudinal axis of the chassis on a forward portion thereof, the operator positioned in the cabin if operating the vehicle;
a plurality of wheels coupled to the chassis, including front and rear wheels, to movably support the chassis;
a steering unit having a wheel positioned in the cabin and coupled to at least two wheels, the steering unit operable by the operator to control the direction of movement of the vehicle;
a boom unit;
a tool coupled to an end of the boom unit;
a turntable unit fixedly mounted to the chassis on the longitudinal axis adjacent and separate from the cabin and spaced along the longitudinal axis from the front and rear wheels, and coupled to the boom unit, the turntable unit supporting the boom unit for rotation;
a dump body mounted to a rear portion of the chassis, the dump body having a floor portion and faces for containing the load;
a power plant mounted in the chassis;
hydraulic fluid;
a hydraulic pump coupled to the power plant and generating a supply of pressurized hydraulic fluid;
a valve control block unit coupled between the hydraulic pump and the turntable and boom units, the valve control block unit receiving pressurized hydraulic fluid from the pump; and
a control unit generating at least one control signal based on control action of the operator, the control unit coupled to supply the control signal to the valve control block unit, the valve control block unit controlling at least one flow of pressurized hydraulic fluid to the turntable unit and the boom unit, based on the control signal, the control unit capable of controlling the flow of pressurized hydraulic fluid to the turntable unit to cause the boom unit and coupled tool with the load to move over a second side of the chassis opposite the first side so that the tool can be moved between a first position in which the tool is positioned forward of the chassis to pick up the load and a second position in which the tool is positioned over the dump body to dump the load into the dump body.

30. A vehicle as claimed in claim 29, wherein the turntable unit includes:
a first part fixedly mounted on the chassis;
a second part rotatably coupled on the first part and coupled to support the boom unit;
a crank member coupled to the second part;
at least one hydraulic actuator coupled between the chassis and the crank member, to rotate the second part relative to the chassis, based on first flow of hydraulic fluid from the valve control block unit, and wherein the boom unit includes
- a first arm pivotally coupled to the turntable unit;
- at least one second arm pivotally coupled to the first arm; and
- at least one boom hydraulic actuator coupled between the first and second boom arms, the boom hydraulic actuator coupled to the valve control block unit, the boom hydraulic actuator moving the second arm relative to the first arm, based on a second flow of hydraulic fluid from the valve control block unit.

31. A vehicle as claimed in claim 29, wherein the control unit includes
    - a boom control element mounted in the cabin, the boom control element operable by the operator to generate a signal; and
    - a controller coupled to receive the signal generated by the boom control element, and generating at least one control signal supplied to the valve control block unit, based on the signal from the boom control element.

32. A vehicle as claimed in claim 29, further comprising:
    - a steering unit coupled to at least two of the wheels, for controlling the direction of movement of the vehicle based on control action of the operator.

33. A vehicle as claimed in claim 29, wherein the cabin includes a first seat for an operator of the vehicle positioned so that the operator can observe an area in front of the vehicle to assist in driving and positioning the tool coupled to the boom unit if moved to the position in front of the chassis, and a second seat for a co-operator positioned behind the first seat and facing toward the rear end of the chassis so that the co-operator can observe the tool coupled to the boom unit if moved to the position overlying the dump body.

34. A vehicle as claimed in claim 29, wherein the dump body has a floor portion surrounded by front, rear, and side faces, the front and rear faces tiltable to respective positions at least level with or lower than the floor portion to provide clearance to hold elongated load objects.

35. A vehicle as claimed in claim 29, wherein the dump body has a floor portion surrounded by front, rear and side faces, and wherein the tool is a load bucket having a width less than the distance between side faces of the dump body.

36. A vehicle as claimed in claim 29, wherein the tool includes a dipper bucket.

37. A vehicle as claimed in claim 29, wherein the tool includes a loader bucket.

38. A vehicle as claimed in claim 29, wherein the chassis is substantially rigid.

39. A vehicle as claimed in claim 29, wherein the power plant is a combustion engine.

40. A vehicle as claimed in claim 29, further comprising:
    - at least one hanger member mounted to the chassis; and
    - an accessory tool coupled to the hanger member.

41. A vehicle as claimed in claim 40, further comprising:
    - a power take-off (PTO) coupled to receive pressurized hydraulic fluid from the valve control block unit, the PTO having a drive shaft extending from the chassis and coupled to the accessory tool, for supplying motive force from the power plant to the accessory tool; and
    - the control unit having a control element generating an accessory activation signal, based on control action of the operator, the control element coupled to supply the accessory activation signal to a controller of the control unit, the controller generating a control signal supplied to the valve block control unit, based on the accessory activation signal, the control signal causing the valve control block unit to supply a flow of hydraulic fluid to the PTO to drive the accessory tool.

42. A vehicle as claimed in claim 41, wherein the accessory tool is a mower.

43. A vehicle as claimed in claim 41, further comprising:
    - at least one hydraulic coupler mounted to the chassis and coupled to receive a flow of hydraulic fluid from the valve control block unit;
    - at least one hydraulic actuator coupled between the hanger member and the accessory and coupled to receive the flow of hydraulic fluid from the hydraulic coupler; and
    - an accessory elevation control element mounted in the cabin and generating a signal, based on a control action of the operator, the accessory elevation control element coupled to supply the signal generated by the accessory element control element to the controller, the controller generating an accessory elevation control signal, based on the signal from the accessory elevation control element, the controller coupled to supply the accessory elevation control signal to the valve block control unit, the valve block control unit supplying pressurized hydraulic fluid to the coupler, based on the accessory elevation control signal.

44. A vehicle as claimed in claim 29, wherein the floor portion is surrounded by the faces which comprise front, rear, and side faces, opposing portions of the front and rear faces tiltable to respective position approximately level with or lower than the floor portion to hold elongated load objects.

45. A vehicle as claimed in claim 29, further comprising:
    - a dump body actuator coupled between the dump body and the chassis, and coupled to receive pressurized hydraulic fluid from the valve control block unit; and
    - a dump body control element mounted in the cabin and operable by the operator to generate a dump signal, the dump body control element coupled to supply the dump signal to the controller, the controller generating a dump control signal based on the dump signal, the controller coupled to supply the dump control signal to the valve control block unit, the valve control block unit supplying pressurized hydraulic fluid to the dump body actuator to extend the dump body actuator to tilt the dump body to dump the load.

46. A vehicle as claimed in claim 29, further comprising:
    - at least one hanger coupled to the chassis and the tool.

47. A vehicle as claimed in claim 29, wherein the dump body can be selectively tilted in one of three directions to dump the load from the body.

48. A vehicle as claimed in claim 29, wherein the vehicle further comprises:
    - a plurality of sockets mounted to the dump body;
    - at least two crossbars mounted to the chassis;
    - a plurality of balls mounted to respective ends of the two crossbars;
    - a plurality of pins insertable into respective sockets to lock respective balls therein to define a tilt direction of the dump body; and
    - a dump body actuator mounted to the chassis and coupled to the dump body, for tilting the dump body relative to the chassis.

49. A vehicle as claimed in claim 29, wherein the cabin has a concave portion opposing the turntable unit, the concave portion providing clearance to permit the turntable unit to rotate.

50. A vehicle as claimed in claim 29, further comprising:

a first axle pivotally mounted to the front portion of the chassis;

first and second hydraulic motors pivotally coupled to opposite ends of the first axle and coupled to the control block unit;

a second axle pivotally mounted to the rear portion of the chassis;

third and fourth hydraulic motors pivotally coupled to opposite ends of the second axle and coupled to the control block unit;

a throttle mounted in the cabin and operable by he operator to generate a throttle signal;

a direction control element mounted in the cabin and operable by the operator to generate a direction control signal; and a controller coupled to receive the throttle signal from the throttle and the direction control signal from the direction control element, the control unit generating at least one control signal supplied to the valve control block unit to control flows of hydraulic fluid to respective first, second, third and fourth hydraulic motors, based on the throttle signal and the direction control signal, the first, second, third and fourth hydraulic motors coupled to rotate respective wheels to drive the vehicle to move, based on respective flows of hydraulic fluid from the control block unit.

51. An apparatus as claimed in claim 50, further comprising:

an additional hydraulic pump coupled to the power plant and pressurizing hydraulic fluid based on power received from the plant;

a steering wheel positioned in the cabin and operable by the operator;

a steering fluid control unit coupled to the steering wheel and coupled to receive pressurized hydraulic fluid from the additional hydraulic pump;

a steering hydraulic actuator coupled between the first axle and the first hydraulic motor and coupled to receive a flow of pressurized hydraulic fluid from the steering fluid control unit, the steering hydraulic actuator controlling the position of the first hydraulic motor with respect to the first axle; and a tie rod coupling the first and second hydraulic motor to turn in tandem based on the position of the steering hydraulic actuator.

* * * * *